No. 686,398. Patented Nov. 12, 1901.
E. FONTAINE.
NEEDLE MAKING MACHINE.
(Application filed Jan. 11, 1897.)
(No Model.) 12 Sheets—Sheet 1.
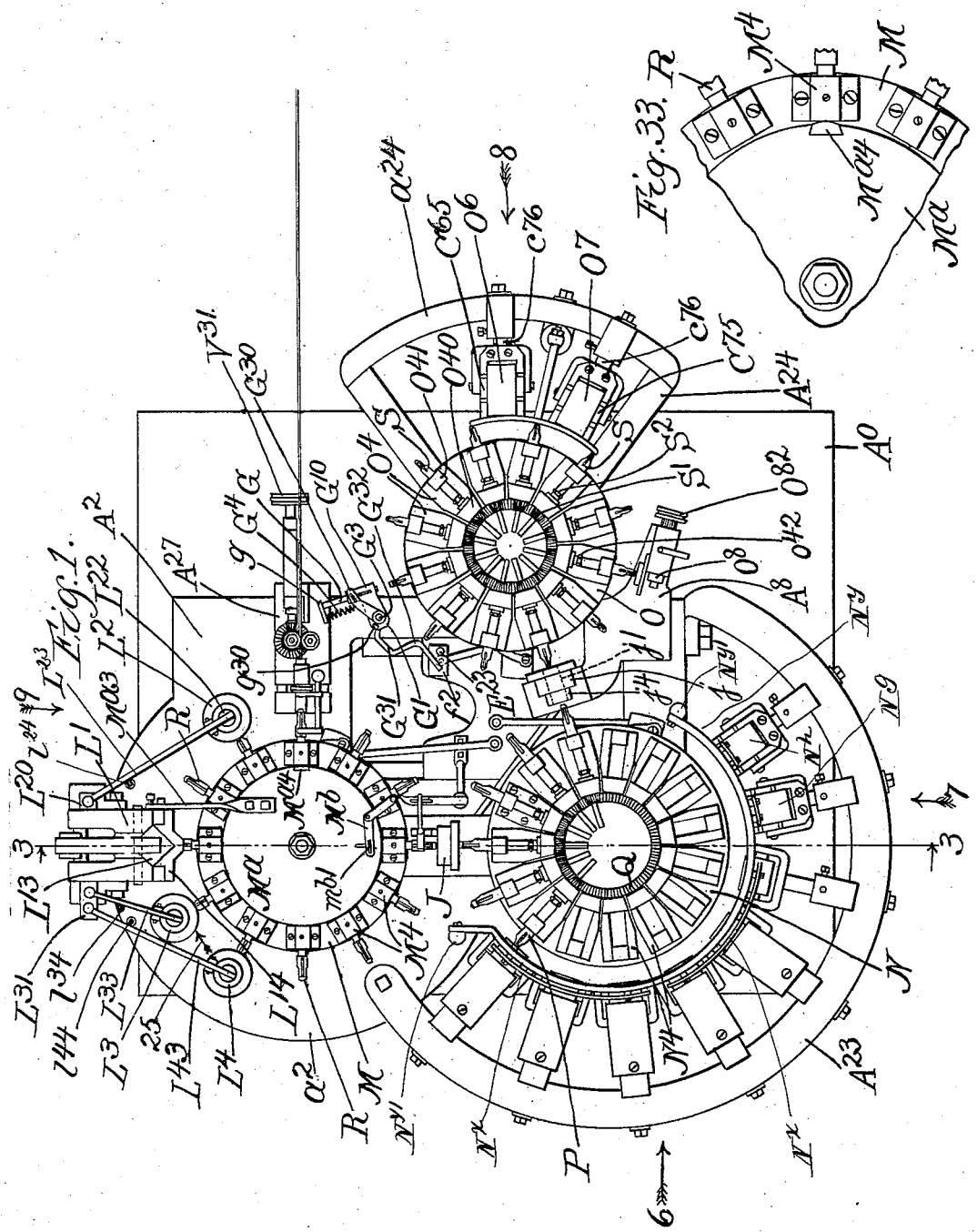
Witnesses.
E. T. Wray.
Jean Elliott.
Inventor.
Eugene Fontaine
by Burton and Burton
his Attys

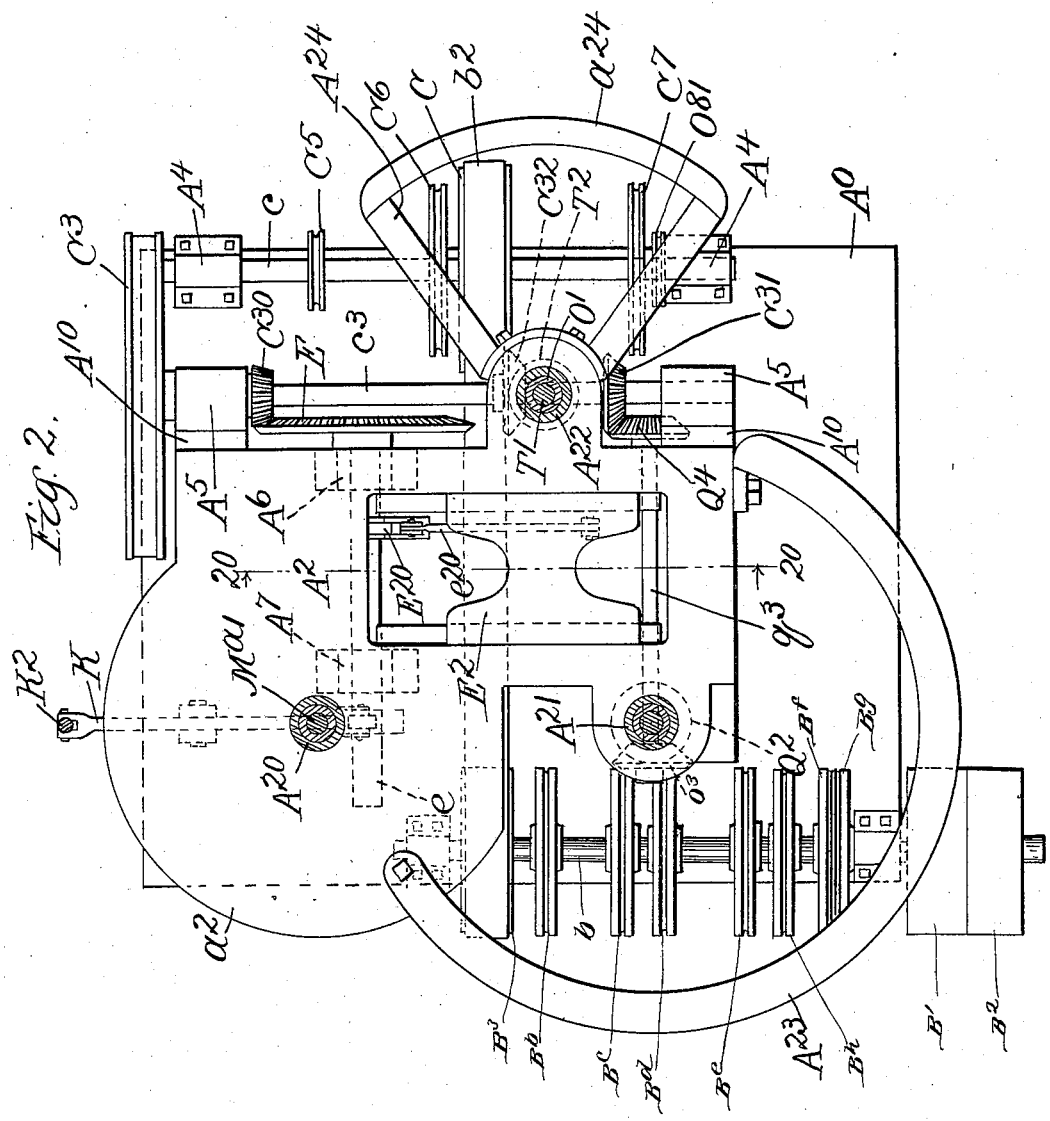

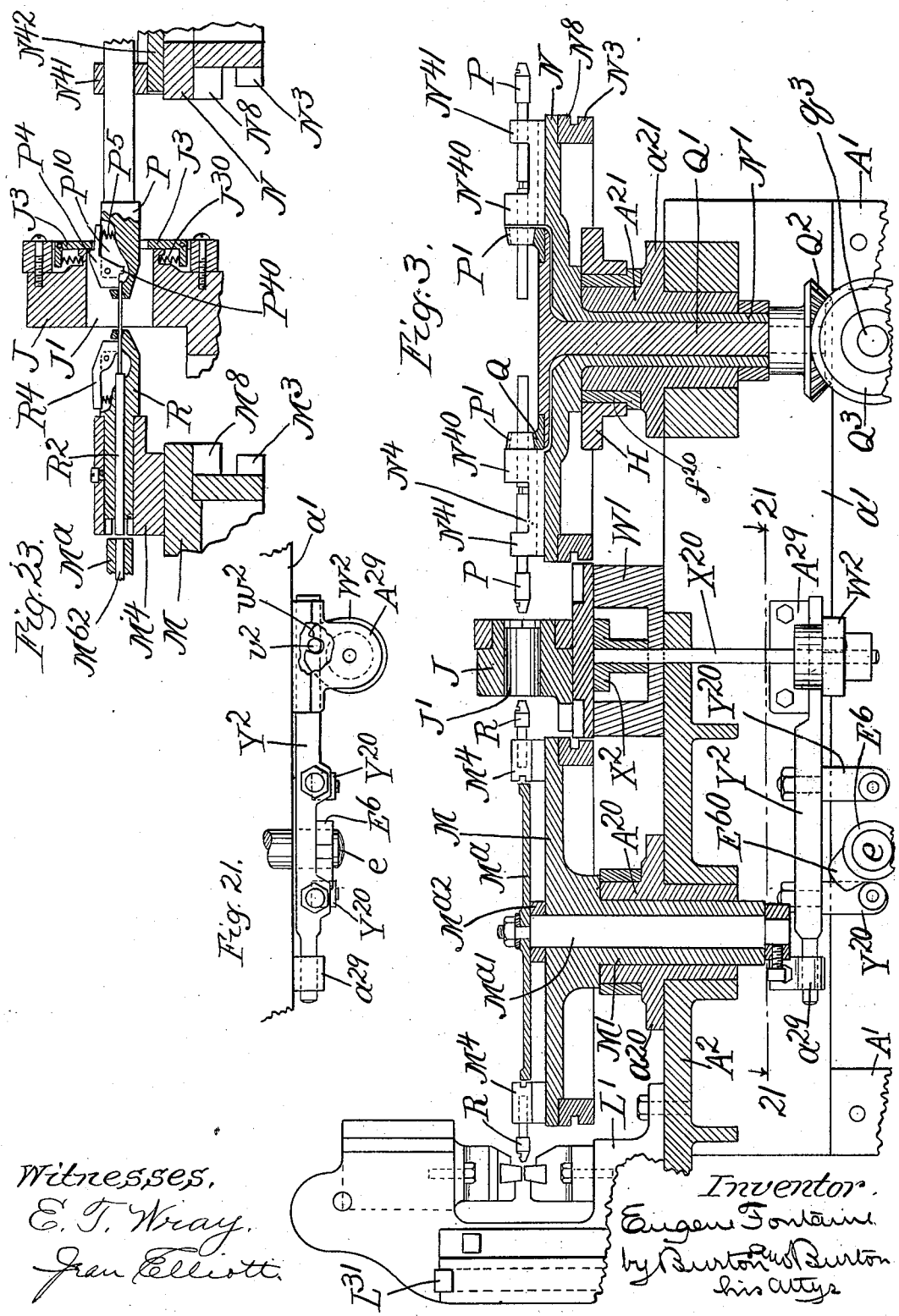

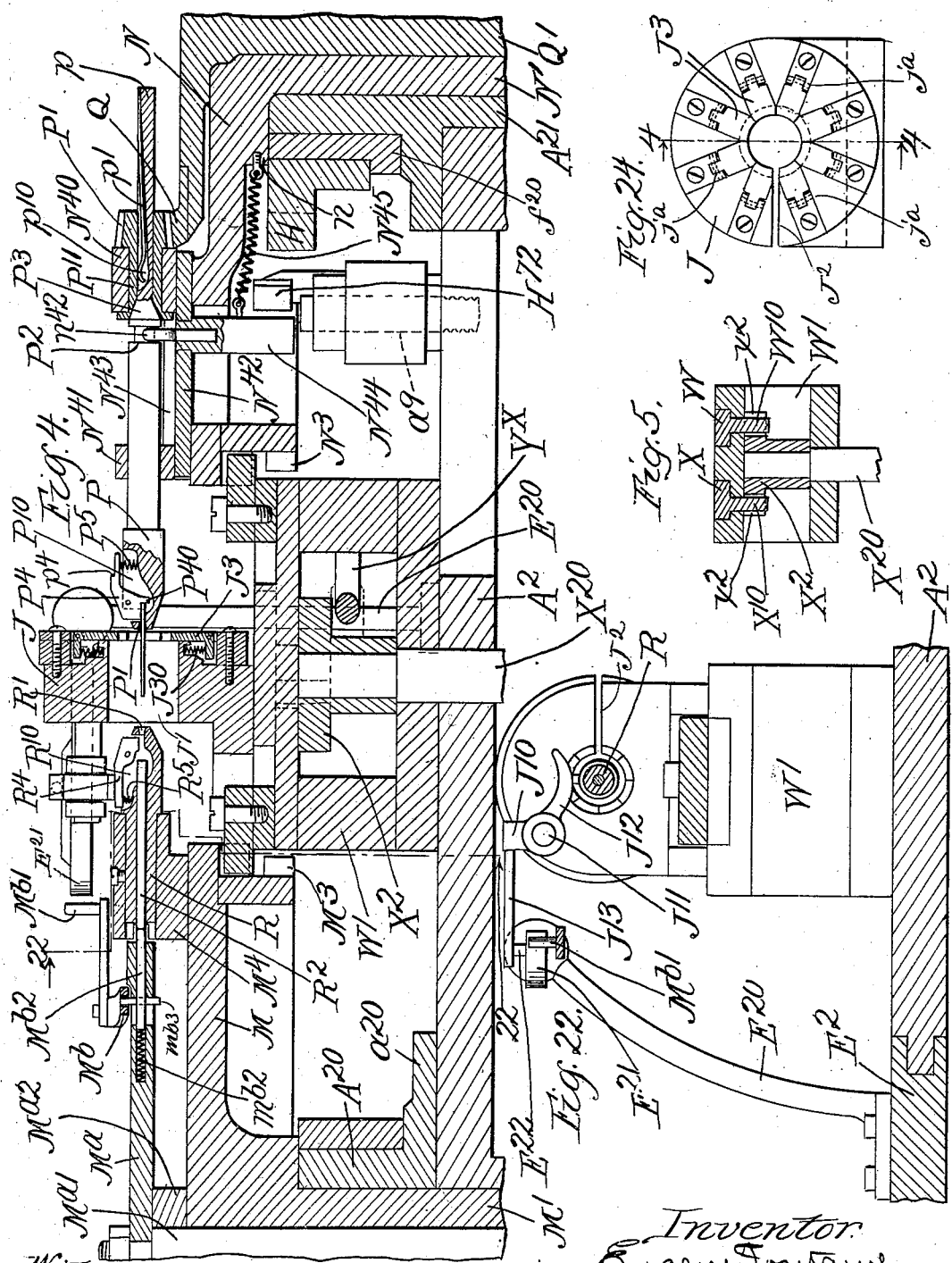

No. 686,398.  
E. FONTAINE.  
NEEDLE MAKING MACHINE.  
(Application filed Jan. 11, 1897.)  
(No Model.)  
Patented Nov. 12, 1901.  
12 Sheets—Sheet 4.
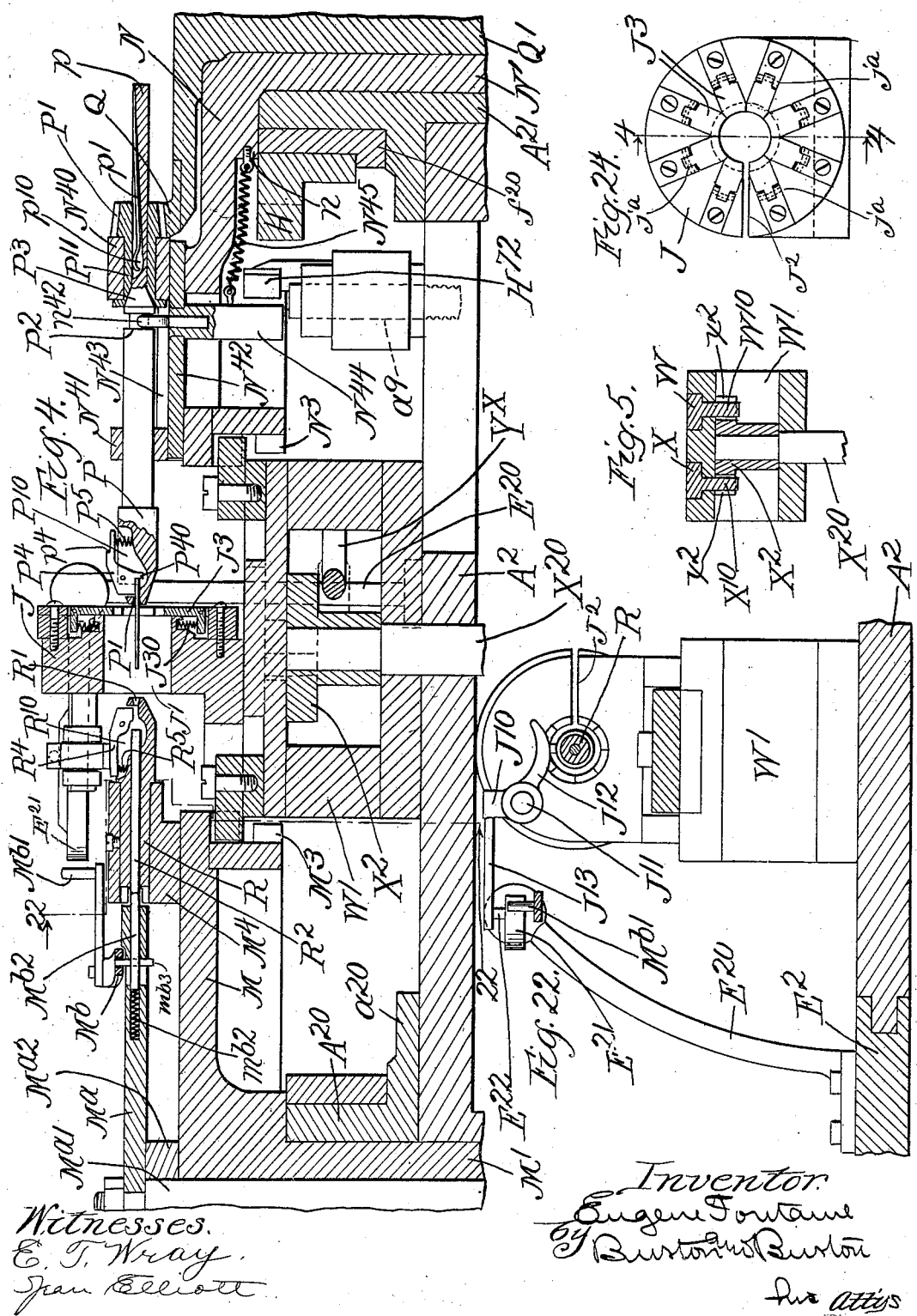
Witnesses.  
E. T. Wray.  
Jean Elliott.
Inventor.  
Eugene Fontaine  
by Burton and Burton  
his Att'ys

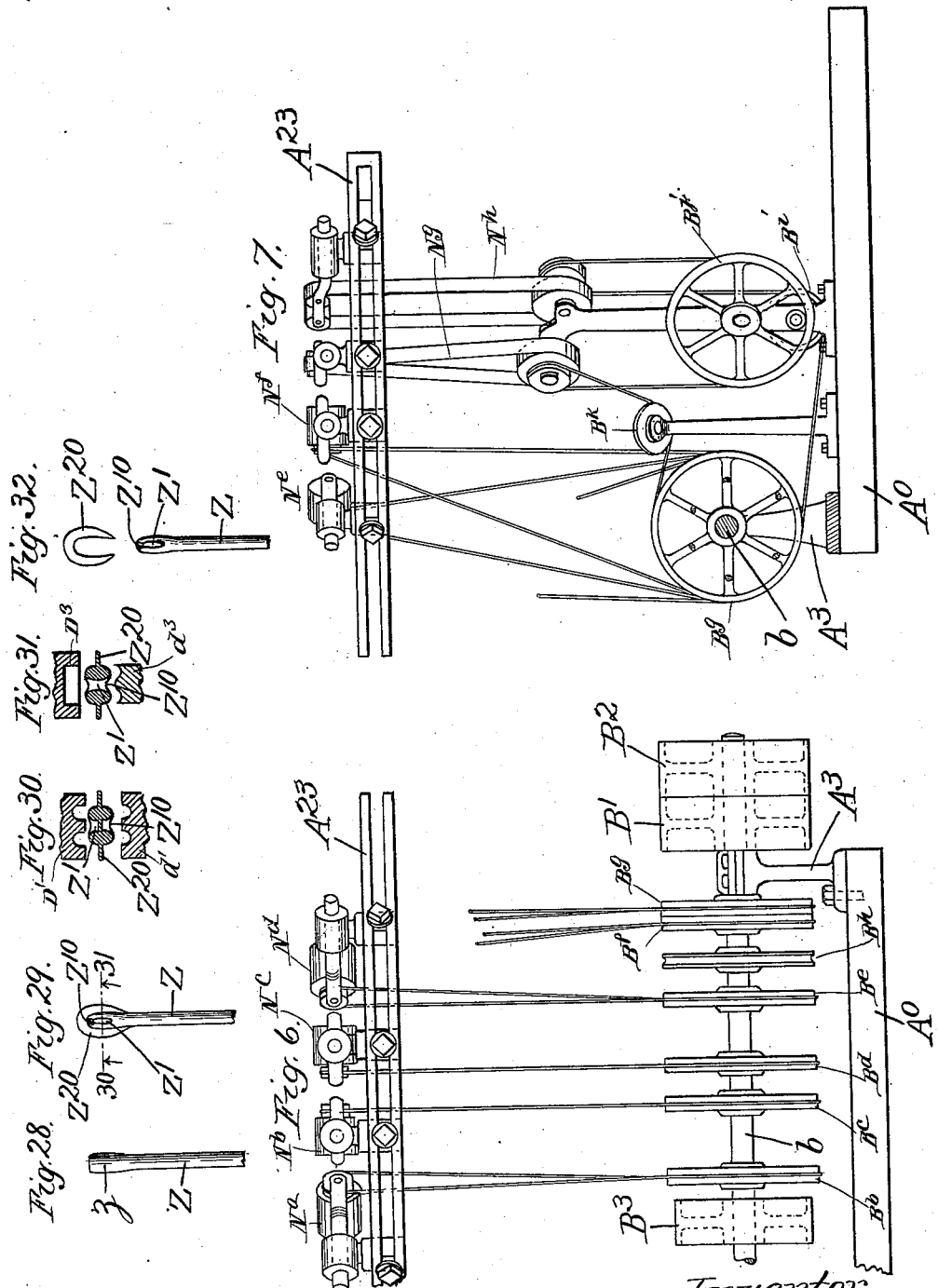

No. 686,398. Patented Nov. 12, 1901.
E. FONTAINE.
NEEDLE MAKING MACHINE.
(Application filed Jan. 11, 1897.)
(No Model.) 12 Sheets—Sheet 6.
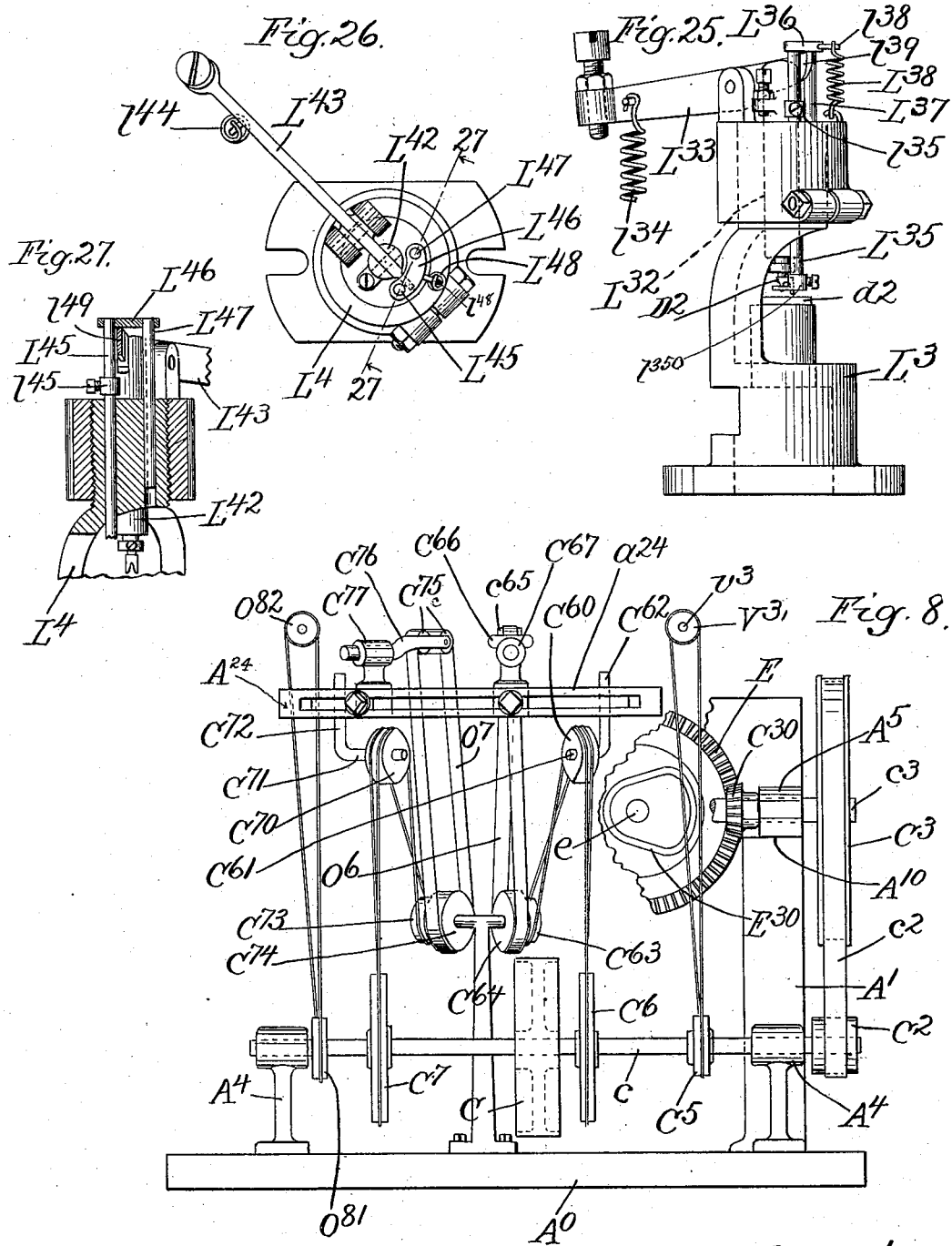
Witnesses,
E. T. Wray.
Jean Elliott.
Inventor:
Eugene Fontaine
by Burton and Burton
his attys No. 686,398.  
E. FONTAINE.  
NEEDLE MAKING MACHINE.  
(Application filed Jan. 11, 1897.)  
(No Model.)  
Patented Nov. 12, 1901.  
12 Sheets—Sheet 7.

Witnesses.  
E. T. Wray.  
Jean Elliott.

Inventor.  
Eugene Fontaine  
by Burton & Burton  
his attys

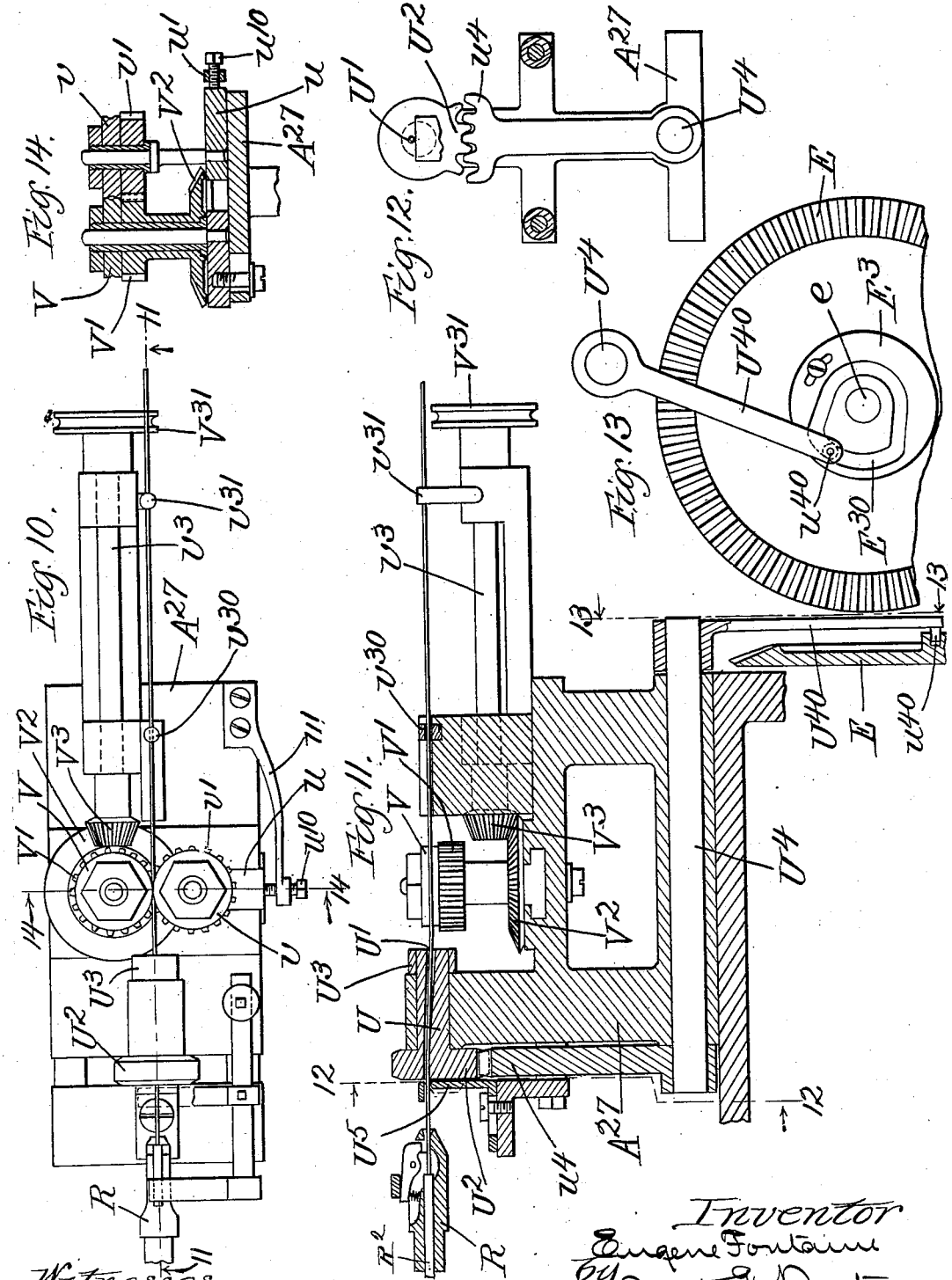

No. 686,398. Patented Nov. 12, 1901.
E. FONTAINE.
NEEDLE MAKING MACHINE.
(Application filed Jan. 11, 1897.)
(No Model.) 12 Sheets—Sheet 9.

Witnesses.
E. T. Wray.
Jean Elliott.

Inventor.
Eugene Fontaine
by Burton and Burton
his Attys.

THE NORRIS PETERS CO., PHOTO-LITHO., WASHINGTON, D. C.

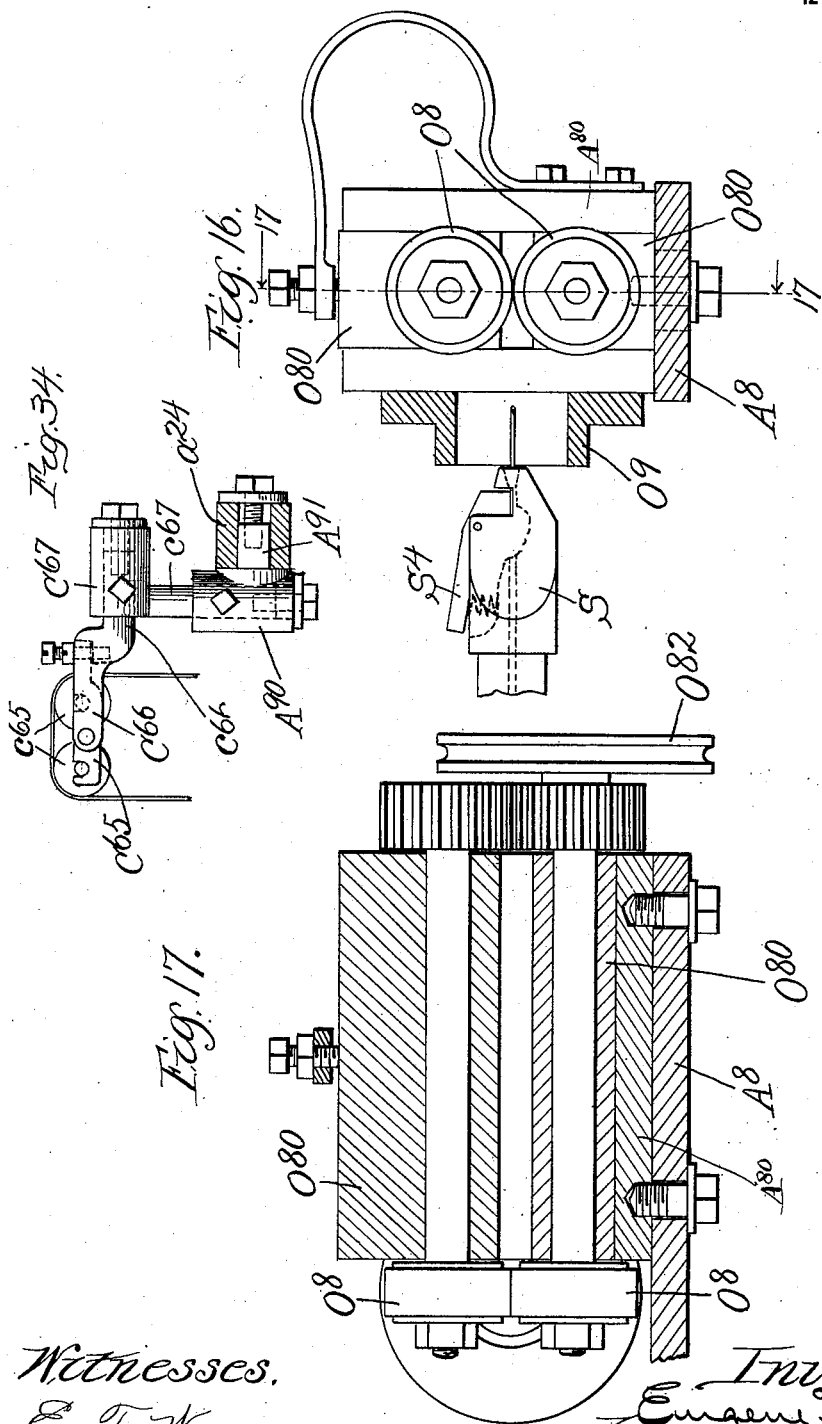

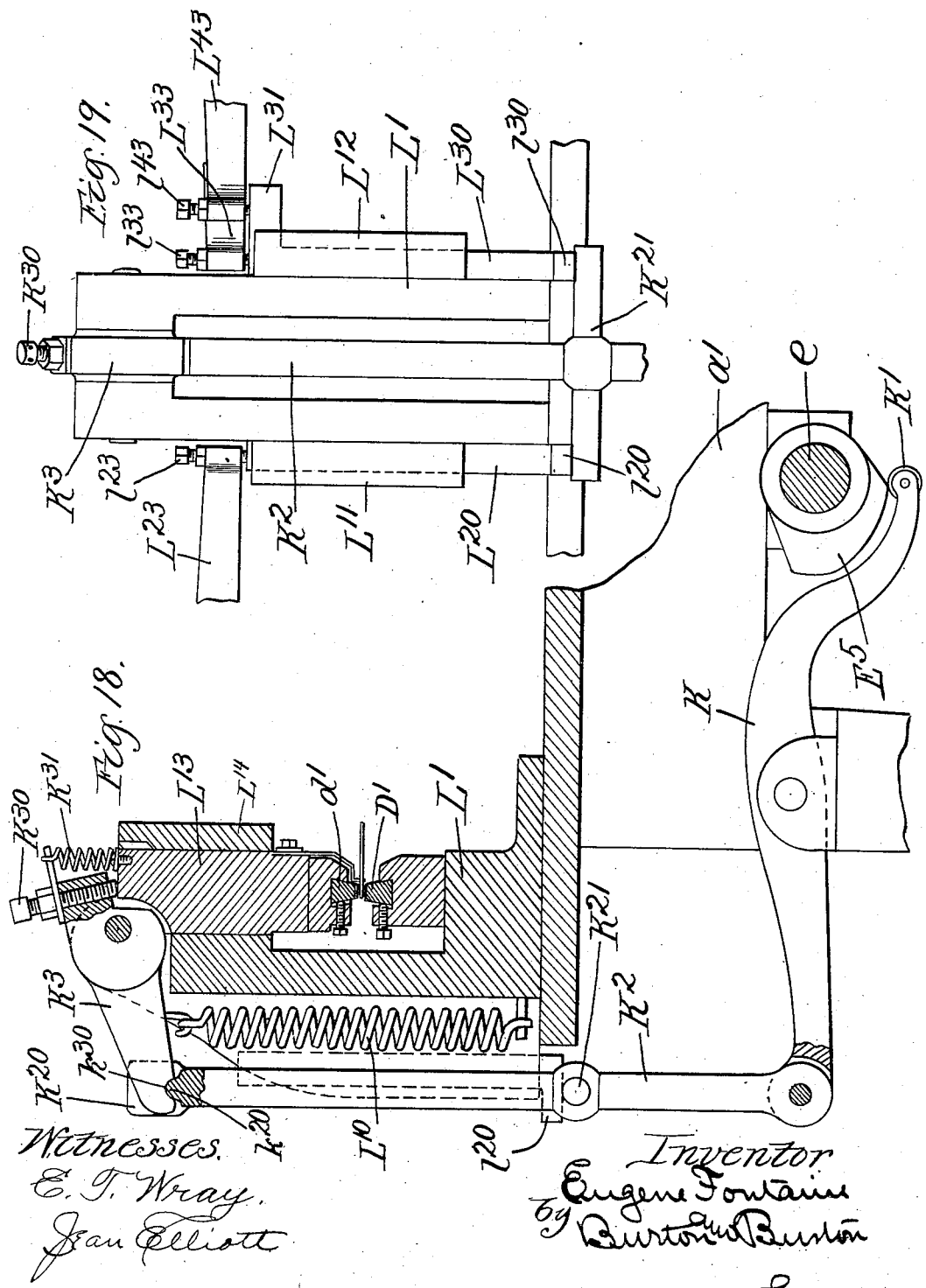

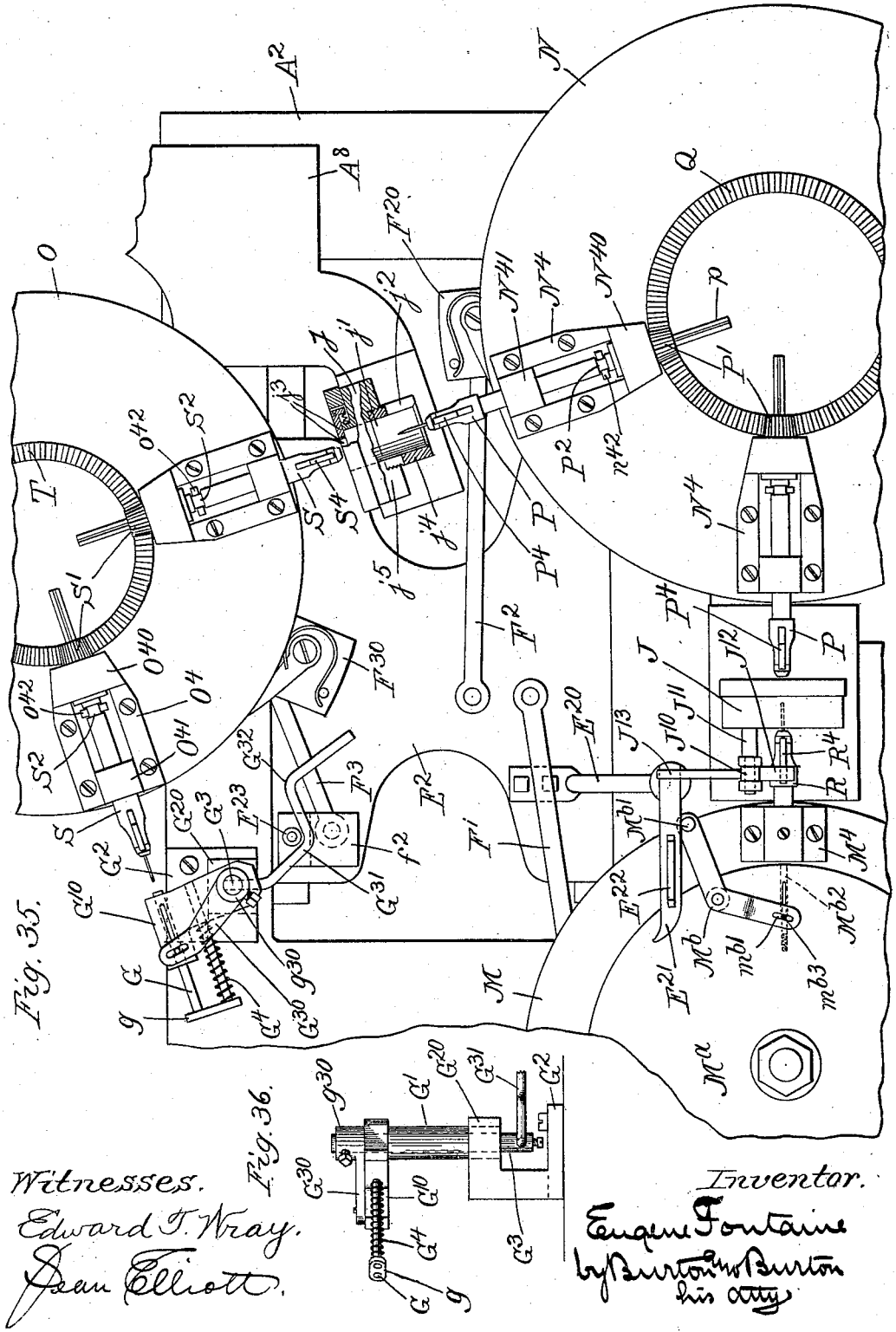

UNITED STATES PATENT OFFICE.

EUGENE FONTAINE, OF DETROIT, MICHIGAN, ASSIGNOR TO X. L. NEEDLE COMPANY, OF CHICAGO, ILLINOIS, A CORPORATION OF ILLINOIS.

NEEDLE-MAKING MACHINE.

SPECIFICATION forming part of Letters Patent No. 686,398, dated November 12, 1901.

Application filed January 11, 1897. Serial No. 618,798. (No model.)

*To all whom it may concern:*

Be it known that I, EUGENE FONTAINE, a citizen of the United States, residing at Detroit, county of Wayne, and State of Michigan, have invented certain new and useful Improvements in Needle-Making Machines, which are fully set forth in the following specification, reference being had to the accompanying drawings, forming a part thereof.

The purpose of this invention is to provide improved mechanism for the manufacture of hand sewing-needles from continuous wire, finishing the needles in their passage through the machine in all respects except tempering and repolishing.

The invention consists in the specific mechanism for the several steps in the process and their association with each other in the relations and order set forth in the claims.

Figure 20:
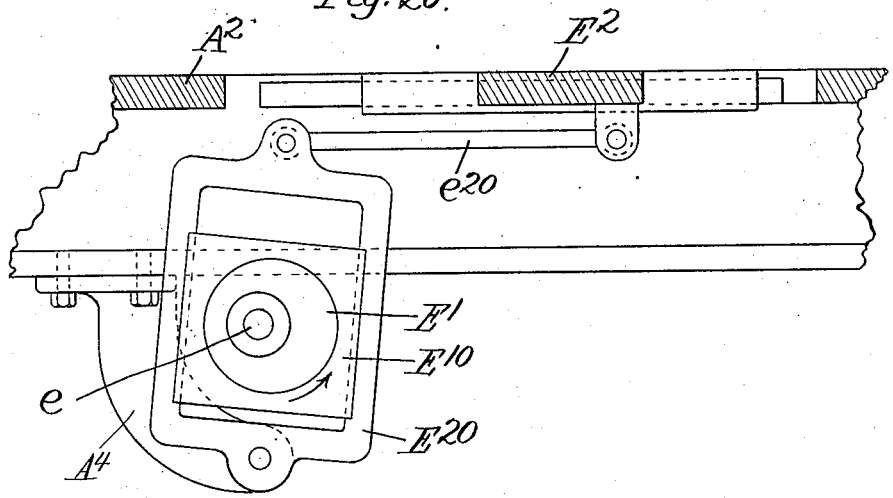
Figure 9:
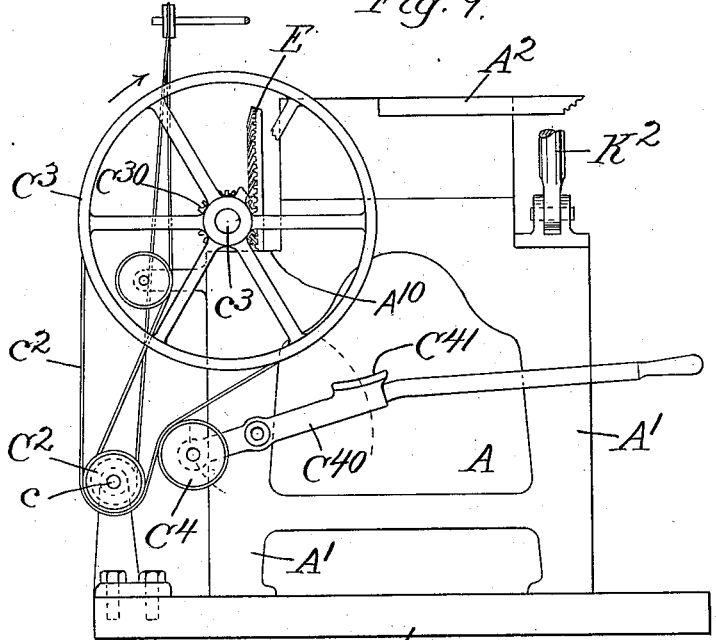
Figure 15:
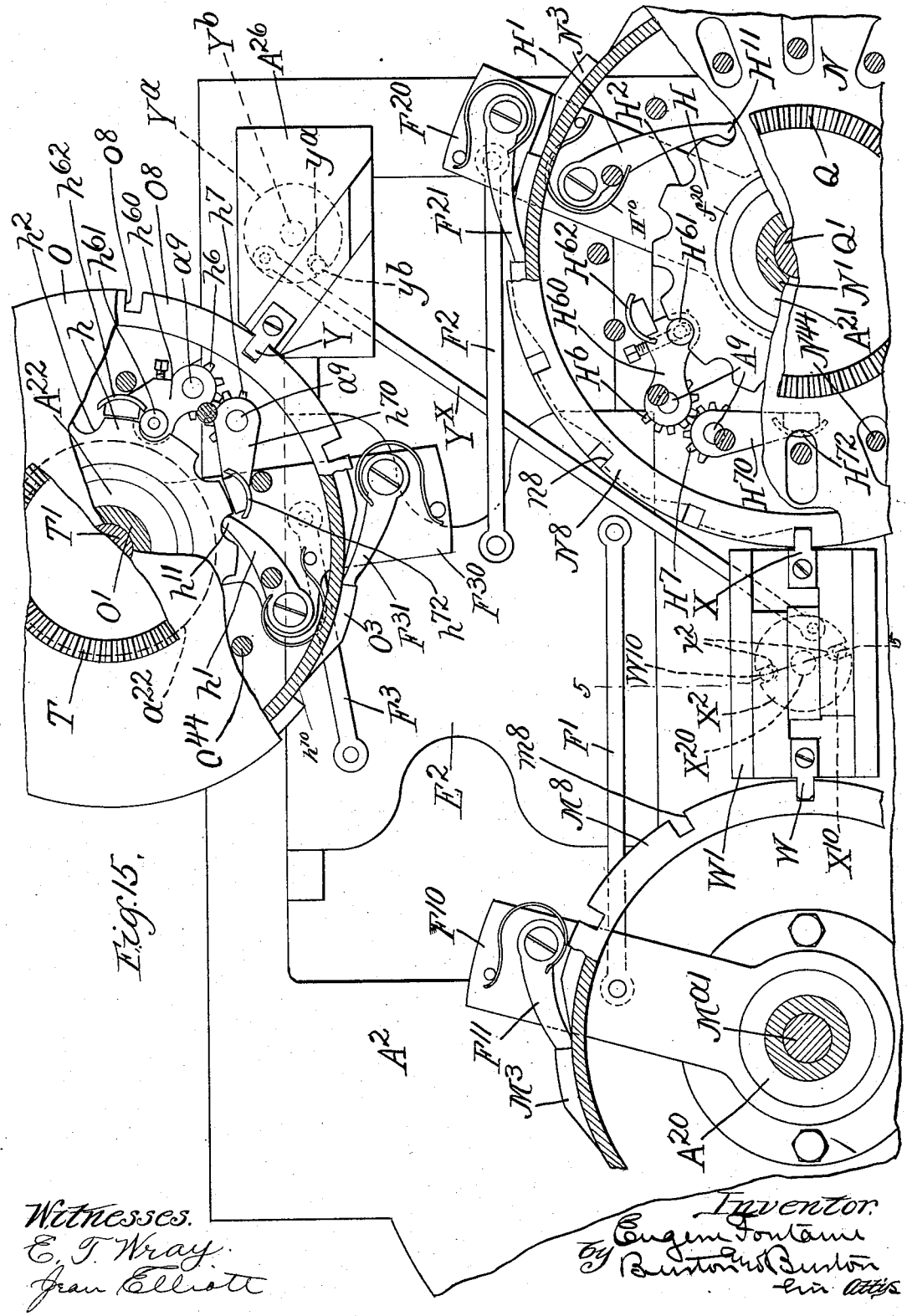

In the drawings, Figure 1 is a top plan of my needle-making machine, minor details being suppressed or omitted to avoid confusing the view, the purpose of the plan being to show the general organization as seen from the top. Fig. 2 is a top plan of the framework of the machine stripped of the greater portion of the mechanism, only such moving parts being shown as will not confuse the view of the framework. Fig. 3 is a section at the vertical plane indicated by the line 3 3 on Fig. 1, certain parts which would be cut in said plane being shown in elevation. Fig. 4 is a detail section in the same plane as Fig. 3, on an enlarged scale, except as to the part shown in Fig. 24, which is shown at the line 4 4 on Fig. 24, and extending only from center to center of the first and second rotating tables. Fig. 5 is a detail section at the line 5 5 on Fig. 15. Fig. 6 is a detail elevation looking in the direction of the arrow 6 on Fig. 1. Fig. 7 is a detail elevation looking in the direction of the arrow 7 on Fig. 1; Fig. 8, a detail elevation looking in the direction of the arrow 8 on Fig. 1; Fig. 9, a detail elevation looking in the direction of the arrow 9 on Fig. 1, said detail elevations being designed to trace the driving power from the principal shafts to the grinding, polishing, and other operating mechanisms. Fig. 10 is a detail plan of the wire feeding and cut-off mechanism, showing partially the first chuck to which the blank is fed. Fig. 11 is a detail section at the line 11 11 on Fig. 10. Fig. 12 is a detail section at the line 12 12 on Fig. 11. Fig. 13 is a detail elevation of the beveled gear-wheel and cam thereon and associated parts as seen looking toward the line 13 13 on Fig. 11. Fig. 14 is a section at the line 14 14 on Fig. 10. Fig. 15 is a detail plan view, partly sectional and having certain parts broken away to show others beneath, of the mechanism for giving step-by-step rotation to the three rotating tables. Fig. 16 is an enlarged sectional detail showing the ejecting-rolls and the chuck about to deliver a needle thereto. Fig. 17 is a section at the line 17 17 on Fig. 16. Fig. 18 is a detail section at the line 3 3 on Fig. 1, showing the structure and means of actuating a die-press concerned in the formation of a needle head and eye, certain parts being shown in elevation. Fig. 19 is a detail outer elevation of the same press, showing also contiguous parts. Fig. 20 is an enlarged detail section at the line 20 20 on Fig. 2, showing the device for transmitting reciprocating motion to a slide-head, which gives rotary step motion to the rotating tables. Fig. 21 is a detail plan showing the device for communicating motion to the table-locking mechanism as seen looking in the direction of the arrow 21 on Fig. 3. Fig. 22 is a detail section at the line 22 22 on Fig. 4, showing a device for opening the chucks on the first carrier to deliver the blanks. Fig. 23 is a detail section showing a chuck on the first table delivering a blank to a chuck on the second table, the section being in the vertical plane of the axes of the two chucks. Fig. 24 is a face view of the device for opening the rotating chucks to receive the blanks. Fig. 25 is a detail elevation of one of the two precisely similar minor die-presses for forming the head and eye as seen looking in the direction of the arrow 25 on Fig. 1. Fig. 26 is a top plan of the other of said similar presses, and Fig. 27 is a section at the line 27 27 on Fig. 26. Fig. 28 is a magnified view of the needle-blank after it has been operated upon by the first press for forming the head. Fig. 29 is a magnified view of the blank after it has been subjected to the action of the second press for forming the head and eye. Fig. 30 is a detail section at the line 30 31 on Fig. 29, showing in section at the same plane the punch and die which form the blank, as shown. Fig. 31 is a section at the same line after the blank has been subjected to the action of the punch and die in the third press, the punch and die being shown in section at the same plane. Fig. 32 is a magnified view of the needle-blank and the part trimmed off from the head in the fourth press. Fig. 33 is a detail showing a stop device to limit the insertion of blanks in the chucks of the first carrier. Fig. 34 is a detail elevation of the "stock" for the polishing-belts. Fig. 35 is a detail plan of portions of the carriers and parts mounted thereon and associated therewith, showing the several devices for transferring the blanks from carrier to carrier and otherwise adjusting them. Fig. 36 is a detail elevation of the setting device for adjusting the protrusion of the blank on the last carrier.

Before proceeding with the description of this machine in detail its general plan will be explained. The main frame supports three horizontal circular tables, each rotating about its own center and carrying radially-arranged chucks or holders by which the needle-blank is held during the performance of the various operations upon it. The wire from which the needles are to be made is advanced by proper feeding devices through a guide and cutter, which severs the proper lengths. The blank thus cut off is received in a chuck on the first table, which, rotating with a step-by-step motion about its center, carries the protruding end of the blank successively to suitable dies and dressing devices, by which the head and eye are formed. After passing the last dressing device pertaining to this table the chuck comes into line with a chuck on the second table, and during the halt at this point the first chuck releases the blank and the second chuck receives it. The second table, rotating similarly to the first table with a step-by-step motion, carries the blank, protruding the end which was not protruded before, past suitable grinding and dressing devices, which form and finish the point. The chuck then comes into line with a chuck on the third table, to which the blank is transferred by mechanism similar to that by which its transfer from the first table to the second was effected, and the step-by-step rotation of this third table carries the protruded end, which is now the head end, past suitable dressing devices, which finish this end. After passing these devices the grasp of the chuck is released by proper mechanism, and the completed needle is withdrawn by being entered between continuously-rotating gripping-rolls and released from the chuck. On the first table the chucks do not rotate, the blank being necessarily held non-rotating while being operated upon by the dies which form the eye and the head and trim the latter, and on the second and third tables the blank is rotated, as is necessary to grind it properly.

A is the supporting-frame for the entire mechanism, comprising suitable standards $A'$ $A'$, a cross-beam $a'$, and a skeleton horizontal top frame $A^2$, which has bearings $A^{20}$, $A^{21}$, and $A^{22}$ for the three rotating tables M, N, and O. This frame comprises also lateral appendages in the form of brackets $A^{23}$ $A^{24}$, which support the various dressing devices and other operating devices pertaining to the second and third tables. The devices which coöperate with the first table, which has non-rotating chucks, are mounted on the horizontal top frame $A^2$, which is suitably extended at $a^2$ for this purpose. The standards $A'$ $A'$, &c., rest upon and are rigid with a solid base $A^0$, preferably of cast-iron, and this base supports the brackets $A^3$ $A^3$, in which the counter-shaft $b$ is journaled, on which are the pulleys $B'$ $B^2$, through which power is communicated to operate the machine, as shown in Figs. 2, 6, and 7. A pulley $B^3$ on the same shaft, through a belt $b^2$, transmits power to a pulley C on a shaft $c$ at the opposite side of the frame, journaled in brackets $A^4$ $A^4$, mounted on the base $A^0$, and a small pulley $C^2$ on the same shaft by means of the belt $c^2$ drives the large pulley $C^3$, fixed on the end of the shaft $c^3$, which is journaled in boxes $A^5$ $A^5$, mounted on hips or shoulders $A^{10}$ $A^{10}$, formed at the upper end of the standards $A'$ $A'$ of the frame A, as shown in Figs. 2, 8, and 9. From the shaft $b$, by means of pulleys thereon, such of the grinding and dressing devices as are located on the side of the machine at which said shaft is located are driven, as shown in Figs. 6 and 7. By means of pulleys on the shaft $c$ power is transmitted to drive the dressing devices, which coöperate with the third table and the delivering feed-rolls adjacent to that table and the wire-feeding device adjacent to the first table, as shown in Fig. 8. The shaft $c^3$, by means of gears thereon, drives (a) the wire-cutting mechanism, (b) the mechanisms which rotate the chucks on the second and third tables, (c) the mechanisms which give to the rotating tables their step-by-step rotary motion, and (d) the dressing and other devices associated with the first table which operate upon the blanks held non-rotating in the chucks on that table. All the mechanisms driven by this shaft $c^3$, being necessarily timed with each other, should operate and rest together, and since it is frequently necessary that one or the other of these mechanisms should be interrupted in its action, so as to remove defective blanks or to inspect the work at different stages, I make the belt $c^2$, which drives the pulley $C^3$, normally slack and provide a tightening-pulley $C^4$, mounted on the lever $C^{40}$ and provided with a brake-shoe $C^{41}$, by the operation of which the belt may be tightened and caused to drive the pulley $C^3$ or slackened while the brake-shoe checks the pulley.

The table M (shown in Figs. 1, 3, 4, and 15) has a spindle $M'$ projecting from its lower side, by which said table is vertically journaled in a box $A^{20}$, mounted, by means of the flange $a^{20}$, on the upper side of the top frame $A^2$ and extending both above and down through said top frame. The table N has a hollow spindle N', by which it is similarly journaled in a box $A^{21}$, similarly mounted, by means of its flange $a^{21}$, on the upper side of the top frame $A^2$, and the table O has also a hollow spindle O', which is journaled in the box $A^{22}$ by a flange $a^{22}$ on the upper side of the top frame $A^2$. Step-by-step rotation of the three tables is produced by the following mechanism, (shown in Figs. 2, 8, 9, 15, and 20:) On the shaft $c^3$ is a beveled pinion $C^{30}$, which meshes with and drives a large beveled gear E, fixed on a shaft $e$, which extends across the frame from side to side, having journal-bearings in boxes $A^6$ $A^7$ at the opposite sides of the frame above the hips $A^{10}$. On this shaft $e$ inside the bearing $A^6$ is the eccentric E', working in a collar $E^{10}$, which slides in a box $E^{20}$, vertically elongated and pivoted at the lower end to a bracket-arm $A^4$ of the frame A and connected by the rod $e^{20}$ to the sliding head $E^2$, for which slide-bearings are provided in the parallel bars of the top frame $A^2$ between the vertical plane of the axes of the first and second tables and the axis of the third table, said bearings and sliding motion being parallel with the said vertical plane. It will be understood that the rotation of the shaft $e$ will give reciprocating motion to the sliding head $E^2$. By reason of the position of the lever below the shaft $e$ the movement of the lever in one direction will be effected by the rotation of the eccentric through the larger arc contained between radii from the fulcrum of the lever tangent to the circle described by the extremity of the longest radius of the eccentric, and the movement of said lever in the opposite direction will correspond with the rotation of the eccentric through the shorter arc inclosed between said radii, thus making the motion in one direction occupy a longer time than the return motion in the opposite direction. To said sliding head are vertically pivoted the pitman or pawl links F', $F^2$, and $F^3$, which at their ends remote from their pivots are connected, respectively, to the levers $F^{10}$ $F^{20}$ $F^{30}$, journaled concentrically with the spindles M', N', and O' of the tables, respectively, and having pivotally attached to them the spring-actuating pawls $F^{11}$, $F^{21}$, and $F^{31}$, respectively, which engage with the ratchet-flanges $M^3$ $N^3$ $O^3$ of the tables M N O, respectively.

In order that the tables M, N, and O may be without liability to be displaced from the positions at which their respective chucks are in line when the tables are at rest and in order especially that they may not be rotated by the bevel-gears which are provided to rotate the chucks on said tables, it is necessary that they should be locked in the position of rest and not merely brought to that position by the pawls. For the purpose of thus locking the tables they are provided with notched locking-rims $M^8$ $N^8$ $O^8$, respectively, the number and position of the notches corresponding to the number and position of the ratchet-teeth by engagement with which the tables are rotated. The notches are thus indicated by the latters $m^8$, $n^8$, and $o^8$ on the tables, respectively. For the several tables I provide sliding bolts W, X, and Y, respectively. Bolts W and X, pertaining to the tables M and N, respectively, are mounted in parallel slide-bearings in a bracket W', secured from the top of the table $A^2$ between the rotating tables M and N. Underneath said bolts is a disk $X^2$, having diametrically opposite notches $x^2 x^2$, into which abutments $W^{10}$ $X^{10}$, which project downward from the slide-bolts W and X, respectively, take. The disk $X^2$ has a vertical shaft $X^{20}$, which extends down through the bracket and through the top of the table and is provided with an additional bearing in a bracket $A^{29}$, which is mounted on the cross-bar of the main frame near its lower edge. Below the bearing of the shaft in this bracket there is secured to said shaft a collar $W^2$, and above the collar, which projects past the lower edge of the bracket, a slide $Y^2$ is provided with slide-bearings in said bracket, or, more strictly speaking, between the same and the collar, as shown in Figs. 3 and 21. The collar $W^2$ has one notch $w^2$ corresponding to one of the notches in the disk $X^2$, and into this notch a stud $v^2$ from the slide $Y^2$ takes. The slide $Y^2$ extends along horizontally by the side of the frame-beam above and past the shaft $e$ and beyond said shaft is provided with an additional slide-bearing in the small bracket $a^{29}$. On the shaft $e$ is a cam $E^6$, having one projection $E^{60}$, and the slide $Y^2$ has two fingers $Y^{20}$ $Y^{20}$ projecting downward in the plane of the cam $E^6$ at opposite sides thereof and at a distance apart equal to the greatest diametric measurement of the cam—that is, its dimension measuring from the point of the projection through the center to the opposite periphery—so that as the cam rotates with the shaft $e$ said projection colliding at one side with one of the fingers $Y^{20}$ will shift the slide in one direction, and as it continues its rotation collides with the opposite finger and shifts the slide back in the opposite direction. The cam $E^6$ is mounted on the shaft $e$ with its projection in such relation to the eccentric which operates the slide-head as to cause said projection to shift the slide $Y^2$ in one direction at the instant the rotating tables come to rest at the limit of the actuating stroke of the pawl and in the opposite direction at or just before the instant at which the pawls, having been retracted, become engaged with the tables preparatory to actuating them another step. The slide-bolt Y, which locks the table O, obtains slide-bearing in the bracket $A^{26}$, which supports the delivering-rolls and their operating mechanism. To operate this bolt, a disk $Y^a$ is provided on a short vertical shaft $Y^b$, journaled in said bracket, the disk $Y^a$ having the notch $y^a$, into which a stud $y^b$ on the bolt Y takes. A pitman-link $Y^\times$ extends from the disk $X^2$ to the disk $Y^a$ and communicates the oscillating motion of the disk $X^2$ to the disk $Y^a$, causing the latter to actuate the bolt Y in both directions simultaneously with the other bolts W and X.

On the table M are mounted radially-arranged chairs $M^4$, by which the chucks R are rigidly secured to the table.

The table N is provided on its upper side with radially-arranged chairs $N^4$, which have bearings $N^{40}$ and $N^{41}$ for the rotating radial chucks P P P, &c. The table O is similarly provided with chairs $O^4$, having bearings $O^{40}$ and $O^{41}$ for the spindles of the rotating radial chucks S S S. Before proceeding with detail descriptions of these chucks R, P, and S the wire feeding and cutting mechanisms should be described and are shown in Figs. 1, 10, 11, 12, 13, and 14.

A bracket $A^{27}$, mounted with capacity for adjustment in line radial with respect to the table M, is secured upon the upper side of the top frame $A^2$. In the upper part of this bracket there is journaled at the end toward the table M a shaft U, having a longitudinal aperture U', eccentrically situated. At the forward end of this shaft U a segment-gear $U^2$ is made fast to it, and a suitable stop-collar $U^3$ at the rear end retains the shaft longitudinally in its bearing. In the lower part of the bracket $A^{27}$ a rock-shaft $U^4$ is journaled, having at the outer end a lever-arm $U^{40}$, which extends down past the face of the gear E. On the face of said gear there is mounted adjustably a cam $E^3$, having the cam-slot $E^{30}$, and the lever-arm $U^{40}$ has an abutment $u^{40}$, which takes into said cam, so that the rotation of the gear E oscillates the arm and rocks the shaft $U^4$. At the inner end of said shaft a segment-gear $u^4$ meshes with the segment-gear $U^2$, whereby the rotation of the gear E rocks the shaft U in its bearings. The wire from which the needle-blanks are cut is designed to be fed through the longitudinal aperture U' toward and into a chuck R on the table M. To sever the blank from the running wire, I provide a fixed cutter $U^5$, bearing against the end of the shaft U in such a position that the oscillation of said shaft carries the mouth of the aperture U' past the upper edge of such fixed cutter, cutting off a blank from the running wire with a square cut, the length of the blank thus severed being determined by the depth of the insertion of the wire into the receiving-chuck R, which is regulated by the adjustment of the bracket $A^{27}$ toward and from the center of the table M, the chuck R having a bottom stop for the blank, as hereinafter described. Outward from the shaft U, vertically journaled in the bracket, are wire feed-rolls V v. The roll V is rigid with the gear V', which meshes with an equal gear v', which is rigid with the roll v. A larger beveled gear $V^2$, rigid with the gear V', meshes with and is driven by a beveled gear $V^3$ on the inner end of the shaft $v^3$, at the outer end of which is a pulley $V^{31}$, which is rotated by a belt driven by a pulley $C^5$ on the shaft c. $v^{30}$ and $v^{31}$ are guides for the wire, by which it is caused to enter the friction-rolls V and v. The roll v and gear v' have their axle-bearings on a block u, which is set into the bracket $A^{27}$ with capacity for adjustment transversely toward and from the axis of the roll V, and a spring u', mounted on the bracket $A^{27}$, has set through it a screw $u^{10}$, which bears against the outer end of the slide u, whereby the spring tends to hold the roll v and its pinion v' yieldingly toward the roll V and pinion V', respectively, thus giving a yielding grasp to the rollers upon the wire. The slight movement of the movable roll and pinion necessary to adapt the rolls to grasp the different sizes of wire which will be fed between them is too slight to interfere with the proper meshing of the pinions v' V'. The detail structure and operation of the chucks R P S on the tables M N O, respectively, will now be described and are shown in Figs. 1, 3, 4, and 23.

The chucks R P and S have axial apertures adapted to receive needle-blanks and cut away a little back of the ends forming notches to make lateral openings into the axial apertures. The jaws $R^4$ $P^4$ and $S^4$ are pivoted to the bodies of the chucks R P and S, respectively, and provided with springs adapted to hold the ends of the jaws down into the notches $R^{10}$ $P^{10}$ $S^{10}$, respectively, so that they will grasp the needle-blank when the latter is inserted sufficiently into the axial apertures. Of the chucks R and P the axial apertures are shown at R' and P', the notches at $R^{10}$ and $P^{10}$, and the springs at $R^5$ and $P^5$, and the chucks S are in these respects substantially similar to the chucks R, but are not shown in detail in the drawings. In the chuck R the aperture R' extends through the chuck, being enlarged back of the seat of the jaw $R^4$, and a plunger $R^2$ occupies said enlarged portion and protrudes normally somewhat beyond the inner end of the chuck. $M^a$ is a circular disk having a stem $M^{a'}$, which extends down through the central aperture in the spindle M' of the table M, an annular boss or washer $M^{a2}$ about the root of the spindle causing the disk $M^a$ to be stopped and supported on the table M a little above and out of contact with the latter. An arm $M^{a3}$, rigid with the main table, extends to the frame of the press, hereinafter described, which is rigid with the main frame, and being secured thereto holds the disk $M^a$ non-rotable with respect to the table M. This disk serves to support several devices which coöperate with the chucks R. The first device is a shoe $M^{a4}$, which is situated radially in line with the aperture U' in the shaft U, through which the blank emerges when it enters the chuck, as shown in Figs. 1 and 33.

This shoe is therefore radially in line with the chuck when it receives the blank and serves as a rear stop for the plunger $R^2$. The bracket $A^{27}$, being adjusted to bring the cut-off point at such distance from the outer end of the plunger $R^2$ as required by the desired length of blank, the rotation of the table M, carrying the chuck R and the plunger $R^2$ off the shoe $M^{a4}$, permits the plunger $R^2$, and therewith the blank, to be forced inward the distance which the shoe protrudes beyond the periphery of the disk $M^a$. This is necessary in order to accommodate the blank when slightly increased in length by the stretching, which occurs in the process of forming the head and eye hereinafter described.

On the table N at the inner side of the inner bearing $N^{40}$ of each of the chucks P there is a beveled pinion P', having a sleeve $P^{11}$, which is journaled in the bearing $N^{40}$, the spindle of the chuck extending through the sleeve of the pinion and being frictionally driven thereby, said pinion being driven by the horizontal beveled gear Q, whose vertical shaft Q' is journaled within the tubular shaft or spindle N' of the table N, said shaft Q' protruding from the lower end of the table-spindle N' and on its protruding end having a beveled gear $Q^2$, which meshes with and is driven by a beveled gear $Q^3$ on a horizontal shaft $q^3$ in the frame, and having at its outer end a beveled gear $Q^4$, which meshes with and is driven by the beveled gear $C^{31}$ on the shaft $c^3$, as shown in Figs. 2 and 3. Similarly on the table O at the inner side of the bearings $O^{40}$ of each chuck S there is a beveled pinion S', meshing with a horizontal gear T, having the shaft T' journaled within the spindle O' of the table O and having at its lower end a beveled gear $T^2$, which meshes with and is driven by a beveled gear $C^{32}$ on the shaft $c^3$. This structure affords means for rotating all the chucks P and S whenever the shaft $c^3$ is in action and the chuck-spindle is frictionally engaged with the sleeve of the beveled pinion pertaining to it. The detail structure by which the chuck-spindle is held in such frictional engagement and disengaged at proper time is the same for the chucks on the two tables N and O, and the description which will now be given with reference primarily to the chucks on the table N will be applicable to the chucks on table O. In the under side of the chair $N^4$ a bearing radial with respect to the table N is provided for a slide $N^{42}$, which has a fork $n^{42}$ protruding up through the longitudinal opening $N^{43}$ in the chair and engaging the annular groove $P^2$ in the spindle of the chuck. Said spindle inward from said annular groove and between the same and the reduced portion $p$ has a conical shoulder $P^3$, for which a seat is provided in the outer end of the sleeve-shaft $P^{11}$ of the beveled pinion P'. The slide $N^{42}$ has the downwardly-projecting arm $N^{44}$, which protrudes through the table N and affords attachment for a spring $N^{45}$, the opposite end of which is attached to the eye $n$ of the table. This spring tends to hold the chuck withdrawn toward the center and with its conical shoulder seated in the conical seat provided for it in the outer end of the sleeve $P^{11}$ of the pinion P'. To increase the frictional grasp of the sleeve $P^{11}$ upon the chuck P, I provide springs $p'$, attached to the spindles and lodged in longitudinal grooves $p^{10}$ therein and adapted to react outward against the inner surface of the sleeve, in which a slight groove may be cut to seat the springs, and give thereby a somewhat positive grasp, but not so positive as to prevent the chuck-spindles slipping in the collar when any severe resistance is encountered. Mounted on the studs $A^9$ $A^9$ on the frame are segment spur-gears $H^6$ $H^7$, which intermesh. Said segment-gears have arms $H^{60}$ and $H^{70}$, respectively, which have abutments $H^{62}$ and $H^{72}$ bearing against the arm $N^{44}$ of the slides $N^{42}$, which pertain to two chucks P, which are respectively in line with chucks R and S on the tables M and O, respectively. The arm $H^{60}$ of the segment-gear $H^6$ has an abutment $H^{61}$, preferably a stud and roll, which is adapted to take into the notches of the annular cam-plate H, which is mounted concentrically about the stem of the table N, being most conveniently seated outside the collar $f^{20}$, to whose lever-arm $F^{20}$ the table-actuating pawl is pivoted. To this same lever-arm $F^{20}$ there is pivoted a pawl H', provided with a spring $H^{10}$ and having an abutment $H^{11}$, adapted to take into the notches $H^2$ of the annular cam-plate H to rotate the latter step by step in the movement which retracts the pawl $F^{21}$ over the ratchet-flange $N^3$ of the table N, whereby the annular cam-plate moves during the intervals of rest of the table. Such movement, therefore, of the cam-plate by virtue of the engagement of its notches with the arm of the gear-segment $H^6$ and the arm $H^{70}$ of the gear-segment $H^7$ to force outward, with respect to the table N, the slide $N^{42}$, pertaining to two chucks P, which are in line, respectively, with chucks R and S on tables M and O respectively, carrying the chucks engaged with the forks on said slides respectively radially outward, whereby the conical shoulder $P^3$ on the spindle of the chuck P is carried out of frictional engagement with the sleeve $P^{11}$ of the pinion P'. On the bracket W', which supports the locking-slides for the tables M and N, there is mounted a bracket J, having a circular opening J', axially in line with the chucks on said tables which are in line with each other when the tables are at rest. A stud $J^{11}$ projects from this bracket on the side toward the table M, and on said stud there is fulcrumed a lever $J^{10}$, having as one arm a shoe $J^{12}$, overhanging the path of the tail of the chucks on the table M, said lever having also the arm $J^{13}$, projecting in the opposite direction and overhanging the arm $E^{21}$ of the bracket $E^{20}$, which extends upward from the slide-head $E^2$. Said arm $E^{21}$ has a cam-upraise $E^{22}$, which passes under the lever-arm $J^{13}$ as the slide-head moves in the direction to retract the table-feeding pawls $F^{11}$ $F^{21}$ $F^{31}$—that is to say, during the intervals of rest of the tables. At this stage a chuck R stands at rest in line with the chuck P, with its jaw overhung by the lever-arm $J^{12}$, so that when the cam-upraise $E^{22}$, passing under the lever-arm $J^{13}$, lifts the latter it forces down the lever arm or shoe $J^{12}$ on the rear end of the jaw of the chuck and opens the same, releasing the needle-blank from the grasp of the jaw. The parts are so situated that this action occurs after the chuck P has been advanced radially outward and protruded into the circular opening in the bracket J. Forming the margin of said opening on the side toward the table N are a series of radial trips $J^3$, &c., hinged at $j^a$ $j^a$, &c., at their outer ends to the face of the bracket, toward the table N, and adapted to swing outward from that face, their inner ends meeting at their corners and together constituting, by their inner ends, a complete marginal flange about said opening. Springs $J^{30}$, &c., lodge in the bracket and act upon the heels of these trips, tending to seat them against the substance of the bracket, where they are positively stopped in position to constitute the complete flange described. As the chuck P is advanced into the opening of the bracket this marginal flange is encountered by the tail of the jaw $P^4$, and the jaw is thereby forced open and is held open during the remainder of the protruding movement of the chuck, during which the blank in the chuck on the table M is received into the open end of the chuck P. The devices for releasing the needle-blank from the jaw of the chuck R are so situated and the movement is so timed that the blank is not released from the grasp of said jaw until after it has entered the open chuck P, since otherwise the blank released from the grasp of the jaw of the chuck R would drop down at its free end and would miss or fail to enter the chuck P. The tail of the jaw $P^4$ of the chuck P has an abrupt shoulder $p^4$, which runs off the marginal flange formed by the trips $J^3$ just before the end of the outward thrusting movement of said chuck, and thereby the jaw $P^4$ is allowed to grasp the blank received from the chuck R. While the tables continue standing at rest after the chuck P has been thus advanced to the utmost and while the abutment $H^{61}$ is riding over the periphery of the annular cam-plate between the notches, the cam-arm $E^{21}$ is being carried by the slide-head $E^2$ away from the table M. On the disk $M^a$ there is fulcrumed a bell-crank lever $M^b$, having on one arm a stud $M^{b\prime}$, which bears against the side of the cam-arm $E^{21}$, while the other arm of said lever by means of a slot $m^{b\prime}$ engages a pin $m^{b3}$, which projects from a thrust-bolt $M^{b2}$, radially lodged in the disk $M^a$ and provided with a spring $m^{b2}$, tending to thrust it outward. This thrust-bolt stands radially in line with and directly behind the plunger in the chuck, and tends therefore when not restrained to drive the plunger outward and force the blank ahead of it out of the chuck. It is restrained from such action by the abutment of the stud $M^{b\prime}$ against the side of the cam-arm $E^{21}$, but at the extremity of said cam-arm, which is deflected to the right, and when this deflected portion reaches the stud $M^{b\prime}$, the spring operating upon the thrust-bolt forces the latter outward as fast as the slope of the deflected portion of the cam-arm now withdrawing past the stud $M^{b\prime}$ permits. All this occurs while the tables are still at rest and after the chuck P has been thrust out far enough to receive the needle-blank. Preferably the thrust action which drives the needle-blank deeper into the chuck P occurs while the said chuck is still advancing; but it may occur partly or wholly after the jaw of the chuck P has closed on the blank, the spring $m^{b2}$ being desirably strong enough to force the blank inward with respect to the chuck P, notwithstanding the grasp of the jaw thereon. The chuck P has a stop conveniently formed by an inturned lug $P^{40}$ on the jaw $P^4$, which determines the depth to which the blank is thus inserted, and the action of the thrust-bolt in thus forcing the blank into the chuck P is not positive, but caused by the spring, in order that the blank may be driven in against the stop in the chuck without danger of being buckled or bent in the operation. This construction obviates the necessity of the absolute accuracy which would otherwise be necessary in the construction of the cam-plate and all the parts operated thereby to thrust the chuck P outward and also obviates the danger which would result from any unequal wear which might occur either on the cam-plate or on the parts actuated thereby of producing needles of unequal length. With the construction shown any inequality in length of the blanks which might occur through any defect in the operation of the wire feeding and cutting-off mechanism merely causes unequal protrusion of the needle-point while in the chucks on the table N, and such inequality is eliminated by the dressing devices to which the blank is exposed while carried by the chuck P, the longer blank being ground away more than the shorter by the amount of the excessive length. The blank having been delivered to the chuck P and the jaw of said chuck having closed upon it and the plunger having either before or after the closing of the jaw thrust the blank into the chuck until arrested by the stop $P^{40}$, the abutment $H^{61}$ on the arm of the gear-segment $H^6$ runs off the periphery of the cam-plate into the next notch, and the reaction of the spring $N^{45}$ withdraws the slide $N^{42}$, causing it to pull back the chuck P, seating its conical shoulder $P^3$ in the end of the sleeve $P^{11}$, as at first, and the slide-head $E^2$ now commencing its return movement by means of the pawl $F^{21}$ gives the table N another step in its rotation, carrying the chuck, with the needle now grasped in and protruding from it, past the bracket J, which is apertured from the central opening outward at $J^2$ to afford a clear path both for the blank to enter when carried by the chuck R and for said blank to pass out freely while now carried by the chuck P. In the subsequent steps of the table N the needle-blank is carried over the several grinders and polishers arranged adjacent to that table and in the path of the needle-blank, as thus carried by the chuck P. The number and character of these grinding and dressing devices will be such as found necessary in each class of work, being more or less and finer or coarser, according to the requirements of the work. After passing the last of said devices the chuck P comes in line with one of the chucks S on the table O. After the spindles are all filled and the machine is in full operation a needle-blank will be transferred from a chuck P to a chuck S at the same time that a blank is transferred from a chuck R to a chuck P.

Corresponding to the chair $N^4$, having the opening $N^{43}$, slide $N^{42}$, its fork $n^{42}$, and arm $N^{44}$, and with the chuck P, having the groove $P^2$ and conical shoulder $P^3$, and with the spring $N^{45}$ and eye $n$ there are associated with the table O for performing the same functions in the same manner corresponding similar parts which, so far as they appear, are denoted by reference-letters having the same exponents, respectively, letter O being substituted for N and S being substituted for P, and corresponding to the studs $A^9$, cam-plate H, having the notch $H^2$, the spring $H^{10}$, having the abutment $H^{11}$, segment-gears $H^6$ and $H^7$, having the arms $H^{60}$ and $H^{70}$, and the abutments $H^{61}$, $H^{62}$, and $H^{72}$ there are associated with the table O, performing similar functions, similar studs $a^9$, cam-plate $h$, having the notch $h^2$, the spring $h^{10}$, acting on the pawl $h'$, which has the abutment $h^{11}$, spur-gears $h^6$ and $h^7$, having the arms $h^{60}$ and $h^{70}$, and the abutments $h^{61}$, $h^{62}$, and $h^{72}$, and mounted on the frame-top $A^2$ is the bracket $j$, having opening $j'$ and trips $j^3$, which coöperate with the chucks S to open the jaws $S^4$ to receive the blanks in the same manner as the bracket J, having openings $J'$ and trips $J^3$, coöperates with the chucks P to open the jaws $P^4$ to receive the blanks from the chucks R; but to open the jaws of the chucks P to deliver the blanks to the chucks S nothing more is required than an annular flange $j^4$ on the bracket $j$, into which the chucks P are thrust when the table is at rest, the tail of the jaw $P^4$ colliding with the margin of the flange as the chuck enters and the jaw being thereby lifted from the blank, releasing it after it has been inserted in the chuck S.

When received by the chuck on the table O, the blank is carried, with the head end protruding out of the bracket $j$, through the slot $j^5$ and is advanced step by step as the table is rotated, coming at some stop subsequent to its reception by the chuck into line with a plunger G, operating horizontally in the arm $G^{10}$ of a post $G'$, which extends up from the horizontal arm $G^{20}$ of a bracket $G^2$, mounted on the frame, said plunger being operated radially with respect to the table O by means of the slotted arm $G^{30}$ of the vertical rock-shaft $G^3$, journaled in the post $G'$. A spring $G^4$, connected to the arm $G^{10}$ and to the sidewardly-projecting arm $g$ of the plunger G, tends to withdraw the plunger from the chuck which stands in line with it. The vertical rock-shaft $G^3$ has a second arm $G^{31}$ below the horizontal arm $G^{20}$ of the bracket $G^2$, and said arm $G^{31}$ when the plunger is withdrawn by the spring stands in the path of an abutment $E^{23}$ on the slide-head $E^2$. This abutment is conveniently a small stud and roll mounted on the block $f^2$, by which the pitman-link $F^3$, which operates the ratchet to rotate the table O, is pivoted to the slide-head. The arm $G^{31}$ has the angular or V-shaped projection $G^{32}$, whose sides are both oblique to the path of the abutment $E^{23}$, so that as the abutment travels with the slide-head in one direction it encounters one of said oblique sides and while traveling in the opposite direction encounters the other oblique side. When the slide-head is making the movement in which the pawls are retracted and the tables are at rest, the engagement of the abutment $E^{23}$ with the arm $G^{31}$ causes the plunger G to be thrust out toward the chuck and to encounter the protruding head of the needle held therein. The lever-arm $G^{30}$ of the rock-shaft $G^3$ is adjustable on the rock-shaft, having a hub $g^{30}$, provided with a set-screw for that purpose, so that the thrust of the plunger may be regulated at will, whereby said plunger is caused to force the blank a greater or less distance back into the chuck when it encounters said blank. The purpose of this device is to cause the blanks to be protruded a uniform distance from the chuck when they encounter the final dressing devices which are to operate upon the head and complete the needle.

After passing the plunger the blanks encounter first a polishing-belt $O^6$, by which the edges of the flattened head are slightly dressed, the chuck rotating meanwhile, so that both said edges are presented to the polishing-belt, while the chuck carrying the blank moves past it. At the next stage the blank encounters the polishing-belt $O^7$, by which the end of the head is slightly finished, the form of the head when completed being ovoidal to the point where the flattened surfaces about the eye cut the ovoidal outline, as seen on a magnified scale in Fig. 31. The belts $O^6$ and $O^7$ derive motion from the pulleys $C^6$ and $C^7$, respectively, on the shaft $c$, suitable belts extending from said pulleys around guide-pulleys $C^{60}$ and $C^{70}$, respectively, which are mounted on the stud-axles $C^{61}$ and $C^{71}$, which project from the brackets $C^{62}$ and $C^{72}$, respectively, secured on the bracket $A^{24}$, which constitutes a part of the main frame, as shown in Figs. 1 and 8. From these guide-pulleys the belts pass to the pulleys $C^{63}$ and $C^{73}$, which are rigid with the band-pulleys $C^{64}$ and $C^{74}$, respectively, around which said dressing-belts $C^6$ and $C^7$ extend. To carry the dressing-belts at the upper end, there are provided carriages $C^{65}$ and $C^{75}$, as shown in detail in Fig. 34, having each two rolls $c^{65}\,c^{65}$ and $c^{75}\,c^{75}$, around which the belts respectively extend. These carriages are pivotally mounted intermediate the axis of the rolls in yokes $C^{66}$ and $C^{76}$, having stems $c^{66}$ and $c^{76}$, by which said yokes are secured with capacity for adjustment radially toward and from the table O in brackets $C^{67}\,C^{77}$, which are mounted by means of stems $c^{67}$ and $c^{77}$ in the brackets $A^{90}\,A^{90}$, which are secured by means of their stems $A^{91}\,A^{91}$ in the arc bar $a^{24}$ of the bracket $A^{24}$, being curved in an arc about the axis of the table O and being slotted to permit circumferential adjustment of the brackets $A^{90}\,A^{90}$ in said arm about said axis. These adjustable devices for carrying the polishing-belts have the customary set-screws and jack-screws for adjusting the different parts both to tighten the belt and to bring its working surfaces to the desired plane, the entire structure being familiar in the art of grinding and polishing. After passing the belts $O^6$ and $O^7$ at a subsequent stop the needle, now completed as to form, comes in line with the friction-rolls $O^8$, (shown in Fig. 1 and in detail in Figs. 16 and 17,) whose shaft-bearings are mounted in the box $A^{80}$ on the shelf $A^8$, which is rigid with and forms a part of the frame. These shafts are geared together at the end opposite the rolls, and one of them is provided with a pulley $O^{82}$, driven by a belt from the pulley $O^{81}$ on the shaft $c$. During the halt which occurs while the needle is in line with the rolls the chuck is forced radially outward by the mechanism above described, operated from the cam-plate $h$ through the segment-gears $h^6$ and $h^7$, and is thereby disengaged from its driving-pinion, and simultaneously with such disengagement and as the result of the radial protrusion of the chuck its jaw is forced open as the chuck enters the ring $O^9$, mounted fixedly on the journal-box $A^{80}$. The needle being thus freed from the grasp of the chuck and simultaneously grasped by the continuously-driven friction-rolls is withdrawn from the chuck by the rolls and delivered from the machine in its completed form. The chuck retreats again toward the center of the table before the next step in rotation of the table occurs, so that it clears the ring $O^9$.

I will now describe the mechanisms which are provided to form the head and eye and which operate upon the blank while held in the chuck R, carried by the table M and non-rotating about its axis. On the shaft $e$ there is mounted a cam $E^5$, and on the standard of the frame there is fulcrumed a lever K, having at the inner end an antifriction-roll K', bearing on the periphery of the cam. At the outer end of said lever a link $K^2$ is connected which extends upward and at its upper end articulates with the lever $K^3$ of the press L', as shown in Figs. 1, 2, 18, and 19. The construction of this press is substantially the usual construction of a lever-press. It will, however, be described in detail hereinafter. For convenience of disengaging the link $K^2$ from the press-lever $K^3$, I terminate the link at the upper end in an open fork $K^{20}$, having at the bottom of its notch a semicylindrical pivot-bearing $k^{20}$, which is adapted to lodge in a corresponding semicylindrical pivot-bearing $k^{30}$ on the under side of the press-lever $K^3$, the main spring $L^{10}$ of the press serving to keep the link and lever securely engaged when in operation, but this construction, which constitutes an open joint, permitting the link to be readily disengaged from the lever by merely forcing the latter upward against the tension of the spring. At both sides of the frame of the press L', I provide vertical slide-bearings $L^{11}$ and $L^{12}$, respectively, in which thrust-bars $L^{20}$ and $L^{30}$ are seated and adapted to slide vertically, said thrust-bars terminating at their lower ends in horizontal shoes $l^{20}$ and $l^{30}$, respectively, and the link $K^2$ is provided with a cross-head $K^{21}$, which engages under said shoes when the upper end of the link is properly articulated with the press-lever $K^3$. From the press $L^2$ its operating-lever $L^{23}$ extends in a direction to overhang at its free end the upper end of the thrust-bar $L^{20}$, and a spring $l^{24}$, which retracts the lever and lifts the reciprocating head of the press $L^2$, is attached to said lever near its outer end and is secured at the opposite end to the frame $A^2$, near the bottom of the frame of the press L'. The articulation of the lever $L^{23}$ with the thrust-bar $L^{20}$ is made upon the end of a bolt $l^{23}$, set through the end of the lever $L^{23}$ and adapted to be adjusted to protrude more or less, as required, by the stroke of the reciprocating head of the press $L^2$, as shown in Figs. 1, 18, and 19. At the upper end of the thrust-bar $L^{30}$ there is a cross-head $L^{31}$, and on this cross-head the levers $L^{33}$ and $L^{43}$ of the presses $L^3$ and $L^4$ are arranged to bear, said levers having adjustable articulating bolts $l^{33}$ and $l^{43}$, respectively, similar to the bolts $l^{23}$, and the springs $l^{34}$ and $l^{44}$, which retract said levers, being attached at their upper ends to the levers, respectively, and at their lower ends to the frame $A^2$, near the press L'. By this means the one cam $E^5$ by means of the one lever K operates at the same time all the presses associated with the table M.

The press L' has its reciprocating head $L^{13}$ square in cross-section, with its diagonals, respectively, in the plane and transverse to the plane of action of the press-lever, the front cap $L^{14}$ having suitable seats for the two forward faces of the square head and being itself fitted by means of right-angular rabbets between the cheeks of the press-standard and being by this means adapted to be easily refitted to compensate for wear. The press-lever $K^3$ articulates by means of the adjustable bolt $K^{30}$ with the top of the reciprocating head $L^{13}$ and is connected to said reciprocating head by a spring-link $K^{31}$, which yields to accommodate the relative movements of the lever and the reciprocating head in the descending action of the latter. The press mainspring $L^{10}$ is attached to the face of the press $L'$ and to the under side of the lever $K^3$, just forward of the lodgment of the lever upon the upper end of the driving-link.

The press $L^2$ being designed merely to slightly flatten the blank at the head has no mechanism beyond the reciprocating head $L^{22}$, which is connected pivotally to the short arm of the lever $L^{23}$, the range of movement being so slight that it can be accommodated by slight play at the pivotal connection of the lever with the head. The presses $L^3$ and $L^4$ being designed the first to punch out the eye and the second to cut away by punching the excess of metal around the head require strippers, and for this purpose the overhanging heads of the presses $L^3$ and $L^4$ are penetrated by the reciprocating heads $L^3$ and $L^4$, respectively, and by the stems $L^{35}$ and $L^{45}$, which at their lower ends carry the similar strippers, that which pertains to the stem $L^{35}$ being shown at $l^{350}$. (See Figs. 25, 26, and 27.) Cross-heads $L^{36}$ and $L^{46}$, attached rigidly to the upper ends of the stems $L^{35}$ and $L^{45}$, respectively, have rigid with them the guide-rods $L^{37}$ and $L^{47}$, for which guideways are provided in the overhanging heads of the presses $L^3$ and $L^4$, whereby it is possible to make both the stripper-stems and the guide-rods round and to pass them through cylindrical bores in the heads. Springs $L^{38}$ and $L^{48}$ are attached to the top of the frames of the presses $L^3$ and $L^4$, respectively, and at their opposite ends are attached to the overhanging hooks $l^{38}$ and $l^{48}$ on the cross-heads $L^{36}$ and $L^{46}$, said springs tending to hold the strippers depressed to the lowest desired position, stop-collars $l^{35}$ and $l^{45}$ on the stems $L^{35}$ and $L^{45}$ being adjustable to vary as desired the limit of the down-pressing movement of the strippers. The levers $L^{33}$ and $L^{43}$ are provided with short tails $l^{39}$ and $l^{49}$, which engage under the cross-heads $L^{36}$ and $L^{46}$ to lift the strippers, and the latter are designed to be so set that as the action of the lever tends to depress the head it allows the stripper to descend to and rest upon the work before the descent of the head brings the upper die to the work, and this construction causes the die to rise and clear the work before the stripper is lifted from it.

The detail work of the several dies $D'$ $d'$, $D^2$ $d^2$, and $D^3$ $d^3$, which operate upon the head end of the needle-blank Z in the presses $L^2$, $L'$, $L^3$, and $L^4$, respectively, is illustrated in Figs. 28 to 32, inclusive. Between the dies of the press $L^2$ the blank is slightly flattened at $z$, as shown in Fig. 28. This adapts it to seat more accurately on the die D in the press $L'$. In this press the dies $d'$ $d'$ sink the metal at both sides of the head at the center, making a depression $Z'$, which ultimately forms the eye and the countersink about it and the thread-channel $Z^{10}$, leading toward the head end, and at the same time forms the outline of the head accurately, sinking the metal away around the margin of the head at $Z^{20}$, such marginal portion being afterward trimmed off between the dies $D^3$ and $d^3$ in the press $L^4$. The blank in the form shown in Fig. 29 being carried between the punch and die $D^2$ $d^2$ of the press $L^3$, the eye is punched out and the blank is next carried between the dies $D^3$ $d^3$ of the press $L^4$, by which the marginal fin or flange $Z^{20}$ is trimmed off. After passing all the head and eye forming devices associated with the table M the blank, having been delivered to a chuck P on the table N, as above described, is carried in the step-by-step rotation of the table N over the dressing or grinding rolls $N^a$ $N^b$ $N^c$ $N^d$ $N^e$ $N^f$ and the finishing or polishing belts $N^g$ and $N^h$, which are continuously operated, as hereinabove stated, by means of the belts running from the pulleys $B^b$ $B^c$ $B^d$ $B^e$ $B^f$ $B^g$ $B^h$, as shown in Figs. 6 and 7, suitable deflecting-pulleys $B^i$, $B^j$, and $B^k$, having proper supports, being employed to direct the belts driven by the pulley $B^h$ onto the pulleys of the polishing-belt carriers. In order to hold the blanks properly in relation to these dressing and grinding devices, guards $N^x$ $N^x$, &c., are adjustably attached to the rail $N^y$, which is supported by bracket-arms $N^{y'}$, extending from the frame, as shown in Fig. 1. The lower edge of these guards $N^x$ is formed and situated and adapted to be adjusted so that the blanks carried under the guards are held with suitable pressure, developed by slightly springing the blank as it passes onto the dressing roll or belt, the continuous travel of the blank, which is in contact with the dressing devices, respectively, as it is carried by the rotation of the table N, preventing excessive grinding at any one stage or by any one grinder, the blanks being off the grinders during the interval of rest of the table between the step-by-step movements. The "stocks" of the polishing-belts $N^g$ and $N^h$ are of the same familiar construction as those of the belt $O^6$ and $O^7$ associated with table O and already described, and the stocks of the grinding-rolls $N^a$, $N^b$, $N^c$, $N^d$, $N^e$, and $N^f$ are similar, except that the yokes which support the pivoted carriages provided for the belt-rollers become the intermediate bearings of the grinding-rolls without the interposition of such carriage, and both constructions being familiar in the art of grinding and polishing no further detail description is deemed necessary.

I claim—

1. In a machine for making hand-needles, in combination with means for forming the point ends, apparatus for dressing the head ends, and means for holding and rotating the blanks and presenting the head ends while rotating to said dressing apparatus: substantially as set forth.

2. In a needle-making machine, the combination with two sets of rotary chucks or holders and means for rotating them, of transferring mechanism for delivering the needle-blanks from the rotary chucks or holders of the first set to those of the second set: substantially as set forth.

3. In combination, in a needle-making machine, two sets of chucks or holders for the needle-blanks; means for carrying or giving travel to the chucks or holders; means for rotating such chucks or holders; means for transferring the blanks from the rotary chucks or holders of one set to those of the other set, and apparatus for operating successively on the two ends of each blank, while rotated.

4. In combination, in a needle-making machine, two sets of rotary chucks or holders; carriers for the same having step-by-step movement with rest intervals; means for rotating said chucks or holders about their axes; transferring mechanism for delivering the blanks from the rotary chucks or holders of the first set to those of the second set during the rest intervals of the carriers, and forming or dressing devices in position to act on the needle-blanks while rotated in the chucks on both carriers; whereby both ends of the blanks are exposed to dressing or forming action while being rotated.

5. In a needle-making machine, the combination of three carriers, arranged to have each a step-by-step movement with rest intervals, a mechanism for giving them such movement, a plurality of chucks or needle-holders on each carrier, mechanism for rotating the chucks on the second and third carriers, impressing devices located beside the path of the holders on the first carrier, grinding or dressing devices located beside the path of the holders of the second and third carriers, automatic devices for transferring the needle-blanks from the chucks on the first carrier to those on the second and from those on the second to those on the third carrier, and at each transfer changing the end of the blank which is presented outwardly to be operated upon.

6. In a needle-making machine, in combination with chucks to hold the blanks protruding, and suitable carriers for such chucks and mechanism for actuating the carriers, dressing mechanism for operating upon the blanks, arranged along the path of their protruding ends; a continuously-operating driving-train for actuating said dressing mechanisms, and a second driving-train for actuating the carriers and the chucks thereon, and means for intermitting at will the action of said second driving-train.

7. In a machine for making hand sewing-needles comprising a plurality of rotating carriers successively contiguous and chucks thereon adapted to receive and carry the needle-blanks and to deliver the same from each carrier to the next succeeding carrier, and rotating, grinding and dressing mechanisms arranged about one of the carriers for operating upon the blanks carried thereon, non-rotating mechanisms arranged about another carrier, a continuously-operating driving-train actuating the rotating mechanisms and a second driving-train actuating the non-rotating mechanisms and the carriers in their respective movements and means for arresting the latter driving-train, and thereby intermitting at will and simultaneously all the mechanisms driven by said latter train.

8. In a needle-making machine, in combination with chucks adapted to hold blanks protruding; a suitable carrier for such chucks, and means for rotating the chucks on the carrier; dressing mechanisms for operating upon the blanks arranged along the path of their protruding ends; a continuously-operating driving-train for actuating said dressing mechanisms, and a second mechanism for actuating the carrier and rotating the chucks thereon; and means for intermitting at will the action of the second driving-train.

9. In a needle-making machine, in combination with chucks to hold the blanks protruding, and suitable carriers for such chucks and mechanism for actuating the carriers; mechanism for impressing the blanks, both said classes of mechanism being arranged along the path of the protruding ends of the blanks as they are carried in the chucks; a continuously-operating driving-train for actuating said dressing mechanism, and a second driving-train for operating the carriers and the chucks thereon, and the blank-impressing mechanisms and means for intermitting at will the action of the second driving-train.

10. In a machine for making needles wherein chucks to hold the needle-blanks have a traveling movement to carry the blanks to the mechanisms for forming the same, in combination with such chucks and their carrier, means for giving such carrier step-by-step movement with rest intervals, devices for impressing the blanks arranged along the path of their protruding ends and other devices for grinding, dressing and polishing the blanks arranged along said path, the devices of the first group being located at positions to register with the blanks at the rest intervals of the carrier, and the devices of the second group being located at positions to operate on the blanks and only during the travel of the carrier.

11. In a needle-making machine in combination with a plurality of rotating carriers and chucks thereon to carry the needle-blanks protruding, the chucks on one carrier being adapted to register successively with the chucks on the contiguous carrier, means for rotating the carriers simultaneously with a step-by-step movement, impressing devices arranged along a portion of the path of the protruding blanks and adapted to operate upon the same, and grinding, dressing or polishing devices arranged along another portion of the path of the protruding blanks and adapted to operate thereon, the first class of devices being situated in position to register with the protruding blanks at the rest intervals of the carriers, and the second class being situated at positions to operate on the blanks only during the rotary travel of the carriers.

12. In a machine for making hand sewing-needles a plurality of rotating carriers successively contiguous, chucks on each carrier adapted to register successively with the chucks on the contiguous carrier or carriers, means for rotating the carriers simultaneously with step-by-step movement, and means for positively locking the carriers in both directions against rotation during the intervals of such movement.

13. In a machine for making hand sewing-needles in combination with three rotating carriers successively contiguous, chucks on the several carriers, those on the intermediate carrier being adapted to register successively with the chucks on both the contiguous carriers, the chucks on the first and last carriers being adapted to register with feeding devices which respectively supply and discharge the needle-blanks, means for rotating all of said carriers simultaneously with step-by-step movement, and means for locking all the carriers simultaneously automatically and positively in both directions against rotation during the intervals of the step movement.

14. In a machine for making hand sewing-needles, a plurality of successively contiguous moving carriers having chucks for holding needle-blanks protruding; means for moving said carriers simultaneously with step-by-step movement, and means for automatically locking all of the carriers positively to prevent movement in either direction in the intervals of such step movements, the chucks being so situated on the several carriers that a chuck on one carrier registers with a chuck on the contiguous carrier at the rest interval of the carrier, and means for automatically protruding the registered chucks to cause them to approach each other endwise to deliver and receive the needle-blanks while the carriers are thus positively locked.

15. In a needle-making machine, in combination with a plurality of carriers and pawls which rotate them with step-by-step movement, said carriers having abrupt shouldered notches and dogs which engage such notches locking the carriers against rotation in either direction, positively-actuating connections for such dogs timed with respect to the pawl-actuating connections to positively withdraw the dogs the instant before the carrier-actuating movement of the pawls commences, and to positively forward the dogs the instant said actuating movement of the pawls ceases.

16. In a needle-making machine, in combination with a plurality of rotating carriers successively contiguous, chucks on each carrier adapted to register successively with the chucks on the contiguous carrier or carriers, pawls and their actuating mechanisms for rotating all the carriers simultaneously with step-by-step movement, said carriers having abrupt-shouldered notches, and dogs which engage such notches locking the carriers against movement in either direction, positively-actuating connections for such dogs timed with respect to the pawl-actuating connections to positively withdraw the dogs the instant before the carrier-actuating movement of the pawls commences, and to positively forward the dogs the instant said actuating movement of the pawl ceases.

17. In a needle-making machine, in combination with three rotating carriers which are successively contiguous, chucks on the several carriers, those on the intermediate carrier being adapted to register successively with those on both the contiguous carriers, and chucks on the first and last carriers being adapted to register respectively with the feeding devices which supply and discharge the needle-blanks, said carriers having abrupt-shouldered notches and dogs which engage such notches locking the carriers positively in both directions, positively-actuating connections for said dogs, timed with respect to the pawl-actuating connections to positively withdraw the dogs the instant before the carrier-actuating movement of the pawl commences and to positively forward the dogs the instant said actuating movement of the pawl ceases.

18. In a needle-making machine, a plurality of successively contiguous moving carriers having chucks for holding blanks protruding, pawl mechanism for moving said carriers simultaneously with step-by-step movement, said carriers having abrupt-shouldered notches, dogs which engage such notches locking the carriers against movement in either direction, positively-actuating connections for such dogs timed with respect to the pawl mechanism to positively withdraw the dogs the instant before the carrier-actuating movement of the pawls commences, and to positively forward the dogs the instant after such actuating movement of the pawl ceases; the chucks being so situated on the several carriers that a chuck on one carrier registers with the chuck on the contiguous carrier at the rest interval of the carriers; and mechanism for automatically protruding the registered chucks to cause them to approach each other endwise to deliver and receive the needle-blanks while the carrier-locking dogs are engaged in said abrupt-shouldered notches.

19. In a needle-making machine, in combination with chucks adapted to hold the needle-blanks protruding, mechanisms adapted to operate upon the protruding blanks; carriers for the chucks having step-by-step movement with rest intervals constructed, arranged and operating to carry the protruding blanks past said mechanisms; feeding devices preceding and following said carriers adapted respectively to deliver blanks to and receive them from the chucks, said carriers having abrupt-shouldered notches and dogs which engage such notches locking the carriers against movement in either direction, positively-actuating connections for such dogs timed with respect to the carrier-actuating mechanism to positively withdraw the dogs the instant before the carrier-actuating movement commences and to positively forward the dogs the instant after said actuating movement ceases.

20. In a needle-making machine, in combination with yielding feeding device for the wire, a carrier having chucks or holders for needle-blanks and unyielding means to arrest the wire located beyond the grasp of the chucks, mechanism for giving to the carrier step-by-step movement, with intervening halts or rest intervals, means for severing the wire and arresting the severed end, and mechanism for operating the severing device intermittently, timed to release the wire during the rest intervals of the carrier.

21. In a needle mechanism, the combination with movable holders or chucks to receive the needle-blanks, frictional feed-rolls for feeding the needle-wire thereto, intermittent means for bringing the successive holders or chucks into position to receive the wire, and cutting-off mechanism which forms a movable stop, by which the feed of the needle-wire is stopped during the interval of movement of the holders or chucks, substantially as set forth.

22. In a needle-making machine, in combination with a continuously-operating yielding feed device for feeding in the wire, an intermittently-operating carrier having holders for needle-blanks, and mechanism for operating the same, timed to bring it to rest with the blank-holders in line successively with the infed wire, a severing device operating on the wire to cut off a blank therefrom and oppose the severed end of the running wire, mechanism for operating said severing device, timed to uncover the severed end to permit the wire to be advanced during the rest interval of the carrier.

23. In a needle-making machine, a continuously-operating feed for the running wire; a plurality of holders, and a carrier for the same having a step-by-step movement with rest intervals; mechanism which actuates the traveler to give it such movement, constructed, arranged and timed to halt the carrier with a holder in the path of thrust of the yieldingly-fed wire; a body past the face of which the wire is thus yieldingly fed; a cutter coöperating shearwise with said body to sever the wire, one of said coöperating parts having an advancing or cutting and a retreating movement relative to the other part; a stop which arrests the end of the wire, and mechanism for operating the cutting device timed to perform first the withdrawing movement and next the cutting movement during the halt of the carrier.

24. In a needle-making machine, in combination with a carrier having holders for needle-blanks mounted upon it, and mechanism for giving to such carrier a step-by-step movement with rest intervals, a yielding continuously-operated feed device for feeding in the wire located in line with a position of rest of the blank-holders on the carrier, a severing device by which a blank is severed from the running wire and the thrust of the latter is arrested, mechanism for operating such severing device timed to perform during the rest interval of the carrier the entire movement necessary to uncover the end of the running wire to permit the same to be pressed forward to the holder, and to sever and arrest the wire.

25. In a needle-machine, in combination with a movable blank-holder or chuck and means for intermittently giving travel to it, mechanism for feeding needle-wire at intervals into the said holder or chuck, a changeable stop against which the wire abuts to determine the length of blank, and cutting mechanism for cutting off the wire when so abutting, and actuating mechanism for the several mechanisms, coöperatively timed to feed and cut the wire, when the holder or chuck is at rest, substantially as set forth.

26. In a needle mechanism, the combination with movable holders or chucks to receive the needle-blanks, frictional feed-rolls for feeding the needle-wire thereto, intermittent means for bringing the successive holders or chucks into position to receive the wire, and cutting-off mechanism, comprising a movable and stationary cutter, the movable cutter of which in shearing off a blank carries the end of the needle-wire behind the stationary cutter and in the reverse movement carries the end of the needle-wire clear of said stationary cutter, substantially as set forth.

27. In a needle-making machine, in combination with the friction feed-rollers and mechanism for rotating them continuously to feed in the wire with a yielding grasp thereon, a severing device constructed and arranged to sever a blank from the running wire, and by the same movement to be opposed to the severed end of the latter, a carrier and a plurality of holders thereon for needle-blanks to be carried thereby, mechanism for giving to such carrier a step-by-step movement with intervening halts or rest intervals, timed to cause said carrier to halt with the holders successively in line with the inthrust of the wire and remain halted during the entire operating movement of the severing device.

28. In a needle-making machine, wire feeding and severing mechanism, comprising a yielding feed operating continuously on the wire, a wire-guiding body through which the wire is thrust by the feed, such body being arranged to be moved to carry the wire laterally, as distinguished from endwise, at the face of said body at which the wire emerges therefrom; a fixed cutter abutting on the said face and having a cutting edge which the aperture at said face passes and repasses in each full movement of said body; whereby the wire is severed and stopped by said movement in one direction, and is uncovered and permitted to be thrust forward at the reverse movement.

29. In a needle-making machine, a chuck or holder for needle-blanks, a carrier by which such chuck or holder is brought to blank-receiving position, a wire feeding and severing mechanism comprising a yielding feed operating continuously on the wire, a wire-guiding body through which the wire is thrust by such feed, said body being arranged to be moved laterally, as distinguished from endwise, at the face of said body at which the wire emerges; a fixed cutter abutting on said face and having a cutting edge against which the wire is carried by the movement of said body, the point of said edge past which the wire emerges from said guiding-body being substantially in line with the blank-receiving throat or seat in the chuck or holder.

30. In a needle-making machine, a continuously-operating yielding feed for the running wire, a stop to which the end of the wire is fed thereby, a periodically-operated cut-off device which crosses the path of the running wire between the feed and said stop, severing the wire and halting in said path, constituting while it is halted a stop for the running wire.

31. In a needle-making machine, a yielding feed for the running wire, a holder into which it is thrust by such feed, a fixed cutter past whose edge the wire extends to reach the holder, and a moving body coöperating shearwise with the fixed cutter behind the same, causing the wire to be severed without lateral displacement of the detached part.

32. In a needle-making machine, in combination with a carrier having a multiplicity of holders for needle-blanks to be carried thereby, mechanism for giving such carrier, step-by-step movement with the rest intervals, mechanism for feeding in the wire longitudinally with respect to the holders at their position and time of rest, mechanism for severing the running wire to form a needle-blank, a fixed stop on the carrier beyond the path of inthrust of the wire, and a removable stop lodged in each holder adapted to be interchangeable with similar stops of different length; whereby the holder is adapted by interchanging such stops to vary the length of the blanks, substantially as set forth.

33. In a needle-making machine, in combination with a continuously-operated yielding feed device for feeding in the wire, an intermittently-operating carrier having holders for needle-blanks, and mechanism for operating the same timed to bring it to rest with the blank-holders in line successively with the unfed wire, a severing device operating on the wire to cut off the blank therefrom and oppose the severed end of the running wire; and mechanism for operating said severing devices timed to uncover the severed end to permit the wire to be advanced during the rest interval of the carrier, and a changeable stop to arrest the wire when thus advanced and regulate the length of the blank cut off.

34. In a needle-making machine, in combination with a yielding feed device operating continuously on the wire; a carrier and a holder thereon into which the wire is thrust by such feed device; a movable stop for the wire associated with the holder, and a fixed stop beyond the holder against which the movable stop abuts, whereby the protrusion or insertion of the needle may be varied by the fixed stop at different points in the range of travel of the carrier.

35. In a needle-making machine, the combination with the wire feeding and cut-off mechanism which forms the needle-blanks, of a carrier and mechanism for giving it a step-by-step rotation with rest intervals, a plurality of holders or chucks mounted radially on such carrier, and registering successively one by one with the wire-feeding mechanism at the successive halts or rest intervals of the carrier, each chuck or holder being provided with a clamping lever or jaw adapted to hold a needle-blank thrust thereinto, and a removable or interchangeable stop lodged in the throat or blank-receiving aperture of the chuck to limit the degree of insertion of the blank into the latter.

36. In a needle-making machine, in combination with a wire feeding and cut-off mechanism for forming the needle-blanks, a rotating carrier and mechanism for giving it step-by-step rotation with rest intervals, a plurality of chucks or holders for the needle-blanks mounted on such carriers and adapted to register one by one with the wire-feeding mechanism at the halts or rest intervals of the carrier, a fixed stop back of the chucks and a changeable stop in the throat of each chuck arranged to be stopped at its rear or inner end against said fixed stop, and at its forward end to arrest the needle-blank and limit the depth to which such blank may be thrust into the chuck.

37. In a needle-machine, the combination of a plurality of holders or chucks for needle-blanks, means for inserting blanks therein, a carrier for giving intermittent travel to the holders or chucks, one or more eye-forming mechanisms for acting on the blanks when the carrier is at rest, means for definitely limiting the inward movement of the blanks into the holders or chucks and means controlled by the travel of the holders or chucks for allowing further inward movement of the blanks into the holders or chucks at the position for being acted upon by one or more of the eye-forming mechanisms, substantially as set forth.

38. In a needle-making machine, in combination with a wire feeding and cut-off mechanism for forming the needle-blanks, a rotating carrier and mechanism for giving such carrier step-by-step rotation with rest intervals, a plurality of chucks or holders for the needle-blanks mounted on such carrier and arranged to register successively with the wire-feeding mechanism at the rest intervals of the carrier and to receive the blanks when thus registered, a fixed stop located within the path of rotation of the chucks adapted to arrest the blanks thrust into the chucks, a head-impressing mechanism located adjacent to the path of rotation of the chucks opposite a halting position of the latter, the fixed stop being cut back or reduced in line with the blank at such halting position to allow for the elongation of the blank under the action of the impressing device.

39. In a needle-making machine, holders which grasp the needle-blanks in such manner as to protrude one end; devices arranged to operate on the protruded end to form the point of the needle, and a holder to which the blanks are transferred to cause the opposite end to be protruded, and means for grasping the last protruded end to draw the needle from the holder, whereby the needle is discharged head foremost.

40. In a needle-making machine, in combination with a wire feeding and severing mechanism for supplying the needle-blanks, three rotating carriers each comprising a plurality of radially-arranged chucks or holders for the blanks, mechanism for giving to all said carriers step-by-step rotary movement with rest intervals, said carriers being relatively located, and said mechanism being timed, to cause the chucks on the first carrier to register with the wire-feeding mechanism and with the chucks of the second carrier and to cause the chucks of the second carrier to register with those of the third carrier, a mechanism which operates such chucks when they are respectively thus registered or opposed to cause those of the second carrier to receive the blanks from those of the first carrier and those of the third carrier to receive the blanks from those of the second carrier, and the devices located adjacent to the carriers respectively and which coöperate with the chucks on said carriers, said devices being adapted to operate upon the needle-blanks successively, first to form the head, and next to form and finish the point, and finally to finish the head and discharge the needle.

41. In a needle-making machine, in combination with a mechanism for feeding in the wire and for cutting off needle-blanks therefrom, a carrier having non-rotating chucks which receive the blanks from the cutting-off devices, a second carrier having rotatable chucks which receive the blanks from the chucks of the first carrier, and a third carrier having rotatable chucks which receive the blanks from the chucks of the second carrier, all of such chucks being constructed and arranged to hold the blanks by one end and to carry them with the opposite end protruded, whereby the blanks change ends at each transfer from one chuck to another, and devices located adjacent to the path of the protruded ends of the blanks on the first carrier adapted to form the head and eye of the needle at said protruded ends by impressing the same, grinding or dressing devices located adjacent to the path of the protruded ends of the blanks on the second and third carriers and means for rotating the chucks on the second and third carriers; whereby the head and eye of the needle are formed while the blank is carried on the first carrier, the point is dressed and finished while being rotated on the second carrier, and the head is polished and finished while being rotated on the third carrier and the needle is finally discharged head foremost.

42. In a needle-making machine, three carriers having needle-holding chucks on such carriers and means for giving the carriers step-by-step movement with rest intervals, constructed and arranged to cause the chucks of the first carrier successively to register with the chucks of the second carrier at the rest intervals of both, and the chucks of the second carrier successively to register with the chucks of the third carrier; suitable means for delivering blanks to the chucks of the first carrier and for transferring the same endwise to the chucks of the second carrier as said chucks successively register, and for transferring them likewise to the chucks of the third carrier as those of the second and third carriers successively register, a mechanism for forming the head and eye while they are carried by the first carrier and for forming the point while they are carried by the second carrier, whereby the chucks of the third carrier hold the needles with the head end protruded, delivering devices constructed and arranged to withdraw the blanks from the chucks of the third carrier by grasping their protruded ends, whereby the finished points are not exposed to damage in said delivery.

43. In a needle-making machine, in combination with a plurality of carriers and holders or chucks thereon; means for longitudinally advancing a holder or chuck on its carrier, and means actuated by such advance to open the holder or chuck.

44. In a needle-making machine, in combination with a plurality of carriers, holders or chucks on the carriers; means of seizing and holding the blanks in the holders or chucks consisting of mechanism for longitudinally advancing and withdrawing the holders or chucks; means controlled by the advancing movement for opening the holder or chuck to receive the blank; and means controlled by the same advancing movement for closing the holder or chuck on the blank; substantially as set forth.

45. In a needle-making machine, a carrier having holders in which the blanks are held and presented; a second carrier and a plurality of holders thereon having spring-closed jaws; mechanism for advancing the holders or chucks of the second carrier toward the blanks presented by the holders of the first carrier and afterward withdrawing them, each said advanced holder having an arm or lever providing a cam-surface for opening the spring-closed jaw to receive the blanks; a trip arranged to be encountered by said arm or lever in such advancing movement and afterward cleared in the further advance to first open and afterward allow the spring to close the jaw.

46. In a needle-making machine, a carrier having holders in which the blanks are held and presented; a second carrier and a plurality of holders thereon having spring-closed jaws; mechanism for advancing the holders or chucks of the second carrier toward the blanks presented by the holders of the first carrier and afterward withdrawing them, each said advanced holder having an arm or lever providing a cam-surface for opening the spring-closed jaw to receive the blanks; a trip arranged to be encountered by said arm or lever in such advancing movement, and afterward cleared in the further advance to first open and afterward allow the spring to close the jaw; the trip being constructed and arranged to yield to the arm or lever in the withdrawing movement, whereby such movement is prevented from opening the jaw.

47. In a needle-making machine, a carrier having holders in which the blanks are held and presented, a second carrier and a plurality of holders or chucks thereon having spring-closed jaws; mechanism for advancing the holders or chucks of the second carrier to receive the blanks presented by those on the first carrier and afterward withdrawing said holders; a projecting arm or lever on each said holder or chuck of the second carrier having a cam-surface for opening the holder or chuck against the action of the spring to allow it to receive the blank; one or more trips adapted to be engaged by the arm or lever in the advancing movement of the holder or chuck and then cleared by said arm or lever during the further advance, allowing the spring to close the jaw on the blank.

48. In a needle-making machine, in combination with holders for needle-blanks engaged to hold them with an end protruded; a carrier on which such holders are mounted, and mechanism for giving to the carrier step-by-step movement with rest intervals, and means for rotating the chucks arranged to be disengaged by the longitudinal advance or outward thrust of the chucks; a pair of feeding-rolls located opposite a point of rest in the path of the blanks carried by the chucks; shipping devices for advancing chucks as they successively arrive at said point of rest opposite the feed-rolls, whereby the rotation of the blanks is arrested while they are thrust longitudinally into the grasp of the feed-rolls.

49. In a needle-making machine, in combination with the carrier, chucks mounted thereon for holding the needle-blanks; means for giving the carrier step-by-step movement with rest intervals; means for rotating the chucks arranged to be disengaged by the outward thrust of the latter; a pair of feed-rolls located opposite a point of rest of the blanks as they are carried in the step-by-step movement of the carrier; means for thrusting the chucks forward arranged to be actuated as the chucks successively arrive opposite said feed-rolls; a fixed ring mounted between the feed-rolls and said position of rest of the chucks in position to be entered by the advancing chuck and encountered by the movable jaw thereof to open the latter.

50. In a needle-making machine, in combination with a rotating carrier and the chucks carried thereby, shipping devices for protruding the chucks respectively; pawl mechanism for giving the carrier step-by-step rotation, and mechanism connected with the pawl mechanism for actuating the shipping devices during the retreating movement of the pawl mechanism, whereby the chucks are thrust outward while the carrier stands at rest.

51. In a needle-making machine, in combination with a rotating carrier, chucks carried thereby; a gear concentric with the carrier, and pinions conaxial with the chucks respectively engaged and actuated by the gear, the chucks and pinions respectively having feather-and-groove engagement, and adapted to be disengaged by longitudinal outward thrust of the chucks; shipping devices for thus thrusting the chucks outward; pawl mechanism for giving the carrier step-by-step rotation with rest intervals, and mechanism connected with the pawl mechanism for actuating the shipping devices during the retreat of the pawl mechanism, whereby the chucks are thrust forward and out of driving connection with the rotating devices at rest intervals of the carrier.

52. In a needle-making machine, in combination with a carrier and chucks or holders for giving the carrier step-by-step movement with rest intervals, and means for rotating the chucks axially; coöperating feed-rolls adjacent to the path of the blanks carried by the chucks, the chucks being disengageably connected with the mechanism for rotating them respectively, and arranged to be disengaged by longitudinal thrust outward, shipping devices for thrusting the chucks out, timed to give such thrusting movement to the chucks respectively as they come to rest opposite the feed-rolls.

53. In combination with a rotating carrier and chucks thereon, means for rotating the chucks comprising a gear concentric with the carrier and pinions conaxial with the chucks respectively meshing with and driven by the gear, the chucks having their spindles extending through the pinion, said pinion and spindle having feather-and-groove engagement; means for thrusting the chucks radially outward to receive and deliver blanks, said feather and groove being arranged to be disengaged from each other by such outward thrust of the spindle, whereby rotation of the chuck ceases while the blanks are being received and delivered.

54. In a needle-making machine, in combination with a rotating carrier and chucks thereon; means for rotating the chucks about their axes comprising a gear concentric with the carrier, and pinions conaxial with the chucks respectively; the chucks having their spindles extending through the pinions, said spindles having each a spring feather or spline, and the pinions having each an interior recess adapted to receive a feather or spline, said feather or spline and recess being relatively arranged and located to be put out of engagement by the outward thrust of the spindle, and means for thrusting the spindle outward.

55. In a needle-machine, the combination of a holder or chuck, provided with means for giving intermittent travel thereto, a second holder or chuck provided with coöperatively-timed means for giving intermittent travel thereto, the respective paths of travel of the said holders or chucks bringing them at an interval of rest in alinement with and opposite each other, means for advancing one of the two holders or chucks toward the other when so alined, means for opening the first holder or chuck to release the blank, and means actuated by the approach of the holders or chucks for opening the second holder or chuck, substantially as set forth.

56. In a needle-making machine having a rotating carrier and chucks thereon for carrying the needle-blanks, a carrier-actuating pawl-lever and a pawl thereon which actuates the carrier with step-by-step movement, an annular cam-plate mounted about the axis of the carrier, a second pawl on the pawl-lever adapted to operate in the opposite direction from the first pawl and engaging the cam-plate whereby said cam-plate is actuated during the retraction of the carrier-actuating pawl, and mechanism actuated by said cam-plate to protrude the chucks on said carrier.

57. In a needle-making machine having a carrier rotating about its axis and chucks thereon to carry the needle-blanks, said carrier having a ratchet-rim, a lever fulcrumed about the axis of the carrier, and a pawl on said lever engaging the ratchet-rim, an annular cam-plate mounted concentrically about the carrier-axis, and a second pawl on the lever adapted to operate in the opposite direction from the first and engaging said annular cam-plate and mechanism operated by said cam-plate to protrude the chucks.

58. In a needle-making machine having more than two rotating carriers and chucks on said carriers respectively adapted to register successively with chucks on the contiguous carriers, a ratchet-rim on the intermediate carrier and a pawl which actuates it, a lever which carries said pawl, an annular cam-plate mounted concentrically about the axis of said carrier, and a second pawl on the pawl-lever adapted to operate in the opposite direction from the first and engaging the cam-plate, mechanism actuated by said cam-plate adapted to protrude simultaneously the two chucks on said carrier which register with the chucks respectively on the contiguous carriers.

59. In a needle-making machine in combination with three rotating carriers each having chucks for carrying needle-blanks, the chucks on each carrier being adapted to register successively with the chucks on each contiguous carrier, and needle-discharging devices with which the chucks on the last carrier register successively, pawl-and-ratchet mechanism for actuating the three carriers simultaneously with step-by-step movement, annular cam-plates concentric about the axis of the second and third carriers respectively, additional pawls carried by the same part which carries the carrier-actuating pawls but adapted to operate in the opposite direction from said carrier-actuating pawls respectively, and engaging the cam-plates respectively and mechanisms operated by said cam-plates for protruding simultaneously the chucks on the second and third carriers which register respectively with chucks on the contiguous carriers and with the needle-discharge mechanism adjacent to the third carrier.

60. In a needle-making machine in combination with two carriers having chucks for holding needle-blanks mounted upon them respectively, means for causing the carriers to travel with step-by-step movement and halting them simultaneously with proximate chucks on the two carriers respectively in line with each other, means on one of the carriers for rotating the chucks thereon about their axes, means for protruding the rotating chuck while registered with the chuck on the other carrier and a fixed ring into which the rotating chuck is protruded, the jaw of said chuck being adapted to collide with the margin of the ring to cause the chuck to be opened as it protrudes into the ring.

61. In a machine for making hand sewing-needles in combination with two contiguous rotated carriers, means for rotating such carriers simultaneously with step-by-step movement and for automatically locking the carriers against rotation in the intervals between such step movements, radially-situated chucks on the carriers respectively adapted each in turn as the carrier which carries it rotates to come into line with a chuck on the other carrier, the rest intervals of the carrier being timed to occur when the chucks are thus in line, means for advancing the chucks in line radially outward with respect to their respective carriers and toward each other, said chucks having grasping-jaws adapted to be opened by exterior pressure, a fixed ring located between two contiguous carriers having its axis in the plane which contains the axes of the carriers, the diameter of said ring being such that the jaws of the chucks respectively collide with the margin of the ring at entering and are opened to receive and deliver the blanks.

62. In combination with the frame and the slide-head E² therein and the pawl mechanism by which said slide rotates the carriers by its movement in one direction, the lever fulcrumed at its lower end and linked at its upper end to the slide, the eccentric by whose rotation said lever is rocked over its fulcrum at its lower end and caused to reciprocate the slide-head; the pawl mechanism from the slide-head to the carriers being adapted to actuate the carriers in the movement of the slide-head in the direction of the rotating movement of the upper edge of the eccentric; whereby the pawl-actuating movement of the slide-head is of longer duration than its pawl-retracting movement.

63. In combination with a rotating carrier N and the chucks carried thereby, the lever which carries its actuating-pawl; a second pawl on said lever adapted to operate in the opposite direction from the carrier-actuating pawl; a cam-plate mounted concentrically about the axis of the carrier; the intermeshing segment-gears H⁶ and H⁷ having fixed bearings, their lever-arms H⁶⁰ and H⁷⁰ having abutments H⁶² and H⁷², and one of them having a further abutment which rides on the cam-plate and is adapted to enter its notches; slides on the carrier adapted to protrude the chucks having abutments which are engaged by the abutments on the segment-gear lever-arms, as and for the purpose set forth.

64. In a needle-making machine having two carriers and chucks thereon for carrying needle-blanks, means for causing the carriers, to move with step-by-step movement and halting them with proximate chucks on the carriers respectively registered with each other, means on one carrier for rotating the chucks thereon about their axes, means for protruding the registered and rotating chuck, a ring fixed between the carriers conaxial with the registered chucks and into which the said rotating chuck is protruded, said ring having an inner marginal flange consisting of the inner ends of trips pivoted to the ring and stopped thereagainst in the direction in which the chuck is protruded, and springs which tend to hold them respectively so stopped but permitting them to swing outward, the chuck thus protruded having its jaw adapted to collide with said marginal flange as it enters the ring, and having a shoulder which runs off the flange as it is further intruded and which engages a trip or trips as the chuck is withdrawn, whereby regardless of the rotating of said chuck its jaw is opened as the chuck is intruded into the ring and permitted to close toward the limit of such intruding movement and to retreat without being reopened.

65. In a needle-making machine in combination with the carrier having chucks adapted to carry the needle-blanks, a plurality of die-presses having dies adapted to successively impress the needle-blank, devices for moving the carrier with step-by-step movement, a rotating shaft which actuates said devices, a cam on the same shaft and a lever actuated by said cam, and a link by which the lever actuates simultaneously all the die-presses.

66. In a machine for making hand sewing-needles, a plurality of traveling carriers successively adjacent chucks on each carrier adapted to register successively with those on the succeeding carrier; means for moving the carriers simultaneously step by step, and means for positively locking them against movement in either direction in the intervals of the step movement.

67. In a machine for making hand sewing-needles, in combination with chucks adapted to hold needle-blanks protruding; mechanisms adapted to operate upon the protruding blanks and means for carrying the chucks with step-by-step movement to and past said mechanisms; feeding devices preceding and following said carriers adapted respectively to deliver blanks to and receive them from the chucks, and means for positively locking the carriers at the intervals of the step movements against movement in either direction.

68. In a machine for making hand sewing-needles a plurality of carriers having chucks mounted thereon having grasping-jaws by which they are adapted to hold needle-blanks, the carriers having movement by which each chuck on each carrier is successively brought into line with a chuck on the adjacent carrier, a fixed sleeve located between the carriers with its axis in line with such chucks, and suitable means for advancing the chucks from their respective carriers toward each other through the sleeve, the diameter of the latter being such that the jaws of the chuck collide with the inner margin and are opened as the chucks approach.

69. In a needle-making machine, in combination with chucks adapted to hold the needle-blanks protruding and traveling, a carrier for such chucks; plungers extending axially through the chuck-spindles and forming stops for the inserted blank; a thrust-bolt lodged in a fixed bearing back of the path of travel of the chuck-spindles at the point in said path at which the blanks are to be delivered, said thrust-bolt being adapted, when the chuck is at that point, to register with the rear end of the plunger; a spring tending to force the thrust-bolt endwise against the plunger and means for restraining said thrust-bolt and for removing such restraint at proper time for discharging said blank from the chuck, whereby said blank is discharged by yielding pressure.

70. In a needle-making machine in combination with a rotating carrier having chucks adapted to receive the blanks, a plunger extending axially through the chuck-spindle and forming a stop for the inserted blank, a thrust-bolt lodged in a fixed bearing between the path of rotation of the spindle and the axis of the carrier at the point in the circumference of the carrier at which the blank is to be delivered, said thrust-bolt being adapted when the chuck is at that point to register with the inner end of the plunger, a spring tending to force the thrust-bolt outward and means for restraining said thrust-bolt against the pressure of the spring and for removing such restraint at the proper time for discharging the blank whereby the latter is discharged with a yielding pressure.

71. In combination with two rotating carriers each having chucks for carrying needle-blanks, said chucks adapted to register successively as the carriers rotate, the chucks on the first carrier having an axially-situated plunger to stop the blank inserted in such chuck, a thrust-bolt mounted in a fixed seat overhanging said carrier inward from the path of the chucks thereon at the line at which the chucks on the two carriers register, whereby it is in line with the plunger of the registered chuck on the first carrier, a spring tending to thrust said bolt outward against the plunger, means for protruding the chuck on the second carrier when it is thus registered to receive the blank from the other chuck, said chuck on the second carrier having a positive stop to limit the insertion of the blank therein.

72. In a machine for making hand sewing-needles in combination with a carrier having non-rotatable chucks for holding the needle-blanks, and an adjacent carrier having rotatable chucks, said carrier having movement by which the chucks on the one carrier are brought into line successively with chucks on the other carrier and there come to rest, means for advancing the rotatable chuck toward the non-rotatable chuck in line with it and means for opening the jaw of the advancing chuck as it advances, suitable means for opening the jaw of the other chuck, said opening movement being timed so that the blank held by the non-rotatable chuck shall be inserted into the opened rotatable chuck before the jaw of the non-rotatable chuck is opened.

73. In a machine for making hand sewing-needles in combination with carriers having chucks adapted to hold the needle-blanks, said carriers having movement by which the chucks upon one carrier are successively brought into line with chucks on the other carrier and come to rest for the purpose of delivering a blank from the chuck on the first carrier to the chuck in line with it on the second, means for advancing one of said chucks toward the other while they stand in line, and means for opening the jaw of the chuck on the second carrier simultaneously with such advance, and means for subsequently opening the jaw on the first carrier whereby the blank shall be entered into the chuck on the second carrier before it is released from the chuck on the first carrier.

74. In a machine for making hand sewing-needles, in combination with two carriers having mounted on them the chucks for holding the needle-blanks and means for moving said carriers to bring the chucks on the first carrier successively into line with chucks on the second carrier, and for halting the carrier while the chucks are thus in line, and means for advancing one of said chucks toward the other, the chucks on the second carrier having a positive stop to limit the depth of insertion of the blank therein, and a yielding plunger in the chuck of the first carrier by which the blank is ejected.

75. In a machine for making hand sewing-needles in combination with two carriers having mounted on them chucks for holding the needle-blanks, and means for moving said carriers to bring the chucks on the first carrier successively into line with chucks on the second carrier and for halting the carriers while the chucks are thus in line, means for advancing one of said chucks toward the other and means for opening the jaw of the chuck on the second carrier during such advance, means for subsequently opening the jaw of the chuck on the first carrier, the chuck on the second carrier having a positive stop to limit the depth of insertion of the blank and the chuck on the first carrier having a yielding plunger by which the blank is thrust out.

76. In a machine for making hand sewing-needles, in combination with two carriers and means for moving them with a step-by-step movement, chucks mounted on said carriers respectively and adapted to be brought into line successively by such step-by-step movement of the carriers, the chucks on the first carrier being non-rotating, and means on the second carrier for rotating the chucks thereon; mechanism for advancing the rotating chuck toward the other, and means for opening its jaw during such advance; a plunger in the non-rotating chuck adapted to thrust the blank therefrom, and means for actuating the plunger after the rotating chuck has opened.

77. In a machine for making hand sewing-needles in combination with two carriers for moving them with a step-by-step movement, chucks mounted on said carriers respectively and adapted to be brought into line successively by such step-by-step movement of the carriers, the chucks on the first carrier being non-rotating and means on the second table for rotating the chucks thereon, mechanism for advancing the rotating chuck toward the other and for opening its jaw during such advance, means for subsequently opening the jaw of the non-rotating chuck, a plunger in the latter adapted to thrust the blank therefrom and means for actuating the plunger after said chuck has opened.

78. In a needle-making machine in which the needle-blanks are carried in chucks and are transferred from chuck to chuck to change ends; mechanism which operates upon the head end in the first chuck which receives the blank; other mechanism which operates upon the point end in the second chuck to which it is transferred; the second chuck having a positive stop to limit the depth of insertion of the blank, and the first chuck having a yieldingly-actuated plunger to expel the blank, whereby danger of bending the blank in the transfer or bruising the point either in the transfer to or the expulsion from the second chuck is avoided.

79. In a machine for making hand sewing-needles, in combination with two carriers and means for moving them with a step-by-step movement, chucks mounted on said carriers respectively adapted to register with each other successively at the intervals between the step movements of the carriers, the chucks on the first carrier being non-rotating; means on the second carrier for rotating its chucks; means for advancing the rotating chuck toward the non-rotating chuck and for interrupting the rotation of the former during such advance; means for subsequently opening the fixed chuck, the rotating chuck having a positive stop to limit the insertion of the blank therein; the other chuck having a plunger adapted to thrust the blank out, and means for yieldingly advancing said plunger after the other chuck has received the protruding end of the blank, whereby said blank is yieldingly thrust into the chuck on the second carrier to the limit of the stop therein.

80. In a machine for making hand sewing-needles in combination with two carriers having chucks mounted on them to carry needle-blanks, means for giving said carriers step-by-step movement, the chucks being so located on the carriers that those on the one carrier are brought successively into line with those on the other carrier by such step-by-step movement of the carriers, the chucks on the first carrier being non-rotating, and means on the second carrier for rotating the chucks thereon, means for advancing the rotating chuck toward the non-rotating chuck and for opening the former during such advance and means for subsequently opening the latter, the rotating chuck having a positive stop to limit the insertion of the blank, a plunger in the non-rotating chuck adapted to thrust the blank out and means for yieldingly advancing said plunger after the fixed chuck is opened, whereby the blank is yieldingly thrust into the chuck on the second carrier to the stop therein.

81. In a needle-making machine in which the needle-blank is carried by chucks from which one end protrudes to be operated upon and is transferred from chuck to chuck to change ends, mechanism for forming the head arranged to operate upon the blank while it is held in the chuck which first receives it; mechanism for operating upon the point in the chuck which second receives the blank, and mechanism to operate finally upon the head in the third chuck, the second chuck having a positive stop to limit the insertion of the blank therein; the first chuck having a yieldingly-actuated plunger to expel the blank, the third chuck being without any stop to limit the insertion of the point end, and an adjacent device arranged to operate upon the protruded head end while the blank is in the third chuck to force the blank thereinto uniformly, and devices for withdrawing the needle from the third chuck arranged to operate by friction upon the protruded head end, whereby the blank is never pressed endwise between unyielding stops and the point never receives endwise pressure after it is formed.

82. In combination with a carrier and the blank-carrying chucks thereon, a die-press having a die for operating upon the protruded end of the blank, a lever operated by the driving-train and a pitman interposed between said lever and the press-lever being pivoted to one of said parts and articulated without positive attachment to the other, and the press-lever spring tending to hold said lever toward the operating-lever, whereby the pitman is kept in connection at the articulated junction but disengageable thereat at will to throw the press out of action.

83. In combination with a carrier having chucks which carry the needle-blanks with one end protruded, a plurality of die-presses having dies which operate upon the protruded end of the blank, a lever operated by the driving-train and a pitman-link extending between said lever and the main lever of one of the presses pivotally connected to one of said levers and articulated without positive attachment with the other, the press-spring operating upon the press-lever to hold the pitman-link in contact with the lever at said articulated joint, a cross-head on said pitman-link and connections by which said cross-head operates the levers of all the other presses; whereby all the presses may be simultaneously thrown out of action by disengaging the articulated end of the link.

84. In combination with a carrier carrying chucks which hold the needle-blanks with one end protruded, a plurality of die-presses arranged about said carrier having dies adapted to operate upon the protruded end of the blanks, a lever operated by the driving-train and a pitman extending from said lever to the lever of one of the presses, said pitman being pivoted to one of said levers and articulated without positive attachment with the other, slide-bars mounted on the body of said press articulated at their upper ends against the levers of the other presses respectively, the pitman having a cross-head which articulates underneath the lower ends of said slide-bars, and the press-springs operating downward upon the press-levers respectively to hold the pitman in connection with the lever at its articulated end.

85. In combination with a carrier carrying chucks which hold the needle-blanks with one end protruded, a plurality of die-presses grouped about said carrier having dies adapted to operate upon the protruded end of the blanks, a lever operated by the driving-train and a pitman extending from said lever to the lever of one of the presses, said pitman being pivoted to one of said levers and articulated without positive attachment with the other, slide-bars mounted on the body of said press articulated at their upper ends against the levers of the other presses respectively, said slide-bars having at their lower ends shoes protruding past the pitman-link, said pitman-link having a cross-head adapted to engage under said shoes and the press-springs tending to hold the pitman articulated as described.

86. In a needle-making machine in combination with a carrier having chucks for carrying needle-blanks, mechanisms grouped about said carrier in the path of the protruded ends of the blanks for swaging or impressing the same, axial plungers in said chucks free to move longitudinally therein and a fixed disk within the path of travel of the chucks against whose periphery said plunger bears, said periphery being reduced or cut away opposite the forming devices whereby said plunger operates as a positive gage and stop to limit the insertion of the blank and is free to be forced inward by the stretching of the blank under the swaging devices.

87. In combination with the rotating carriers the slide-head and connections therefrom which give them a step-by-step movement simultaneously, the rotating shaft and mechanism intermediate the same and the slide-head by which the latter derives reciprocating movement, a cam on the same shaft and a slide-bar reciprocated by said cam underneath the carriers, a vertical shaft journaled in the frame having a disk at each end, the lower disk having a notch engaged by an abutment on the cam-actuated slide-bar, two parallel sliding bolts mounted above the upper disk, said disk having two diametrically opposite notches and the sliding bolts having abutments which take into said notches respectively, the carriers having peripheral notches adapted to be engaged by said bolts respectively.

88. In combination with the three carriers a vertical shaft journaled in the frame in the vertical plane containing the axis of two of the carriers, means for oscillating said shaft and the slide-bolts at opposite sides of the axis of the shaft actuated in opposite directions by abutments connected therewith, a pitman-link from said shaft to a corresponding shaft located near the circumference of the third carrier and a slide-bolt similarly actuated by the abutment from said shaft whereby all the carriers are locked and unlocked simultaneously.

89. In a needle-making machine, in combination with yielding friction-rolls for feeding in continuous wire, a shaft having a longitudinal aperture through which said wire is fed, said aperture terminating at the discharge end eccentrically with respect to the shaft, a fixed cutter bearing against said end of the shaft and means for rocking the shaft to carry the eccentric aperture back and forth past the cutter.

In testimony whereof I have hereunto set my hand, at Chicago, Illinois, this 21st day of September, A. D. 1896, in the presence of two witnesses.

EUGENE FONTAINE.

Witnesses:
CHAS. S. BURTON,
JEAN ELLIOTT.